United States Patent [19]

Sumiyoshi

[11] Patent Number: 4,565,106
[45] Date of Patent: Jan. 21, 1986

[54] GEAR TRANSMISSION MECHANISM WITH MULTIPLE LAYSHAFTS

[75] Inventor: Masaharu Sumiyoshi, Toyota, Japan

[73] Assignees: Toyota Jidosha Kogyo Kabushiki Kaisha, Toyota; Aisin-Warner Limited, Anjo, both of Japan

[21] Appl. No.: 409,831

[22] Filed: Aug. 20, 1982

[30] Foreign Application Priority Data

Dec. 1, 1981 [JP] Japan ................................ 56-193997

[51] Int. Cl.⁴ .............................................. F16H 3/08
[52] U.S. Cl. ...................................... 74/359; 74/329; 74/331; 74/333; 74/356
[58] Field of Search .................. 74/329, 331, 333, 356, 74/357, 359, 360

[56] References Cited

U.S. PATENT DOCUMENTS 2,599,801  6/1952  Youngren et al. .................... 74/331
3,138,965  6/1964  Brey et al. ............................ 74/331

FOREIGN PATENT DOCUMENTS 55-63040  5/1980  Japan ..................................... 74/331
483069    7/1936  United Kingdom .
604178    6/1948  United Kingdom .
833227    4/1960  United Kingdom .
1426718   3/1976  United Kingdom .................. 74/331
1445618   8/1976  United Kingdom .
1,485,940 9/1977  United Kingdom .................. 74/331
2069635   8/1981  United Kingdom .
2074669  11/1981  United Kingdom .................. 74/331

Primary Examiner—William F. Pate, III
Assistant Examiner—Shirish Desai
Attorney, Agent, or Firm—Oblon, Fisher, Spivak, McClelland & Maier

[57] ABSTRACT

A gear transmission mechanism for an automotive vehicle, with a power input shaft, including several combination assemblies, each including a layshaft and a selectively engagable friction engaging mechanism which can either be engaged to rotationally drive the layshaft from the power input shaft or can be disengaged to rotationally disengage the layshaft from the power input shaft. All the layshafts are substantially parallel with one another and with a mainshaft. Each of several pairs of gear wheels consists of a mainshaft gear mounted on the mainshaft and a layshaft gear mounted on one of the layshafts. Of each of these pairs, one is a fixed gear which is fixed to its shaft on which it is mounted, and the other is an idler gear which, according to the selective operation of a gear engaging system, either can be rotationally coupled to its shaft on which it is mounted, or can be left rotationally disengaged from that shaft. A system is provided for outputting rotational power from a member which rotates along with the mainshaft. Various different speed ratios can be obtained by engaging a particular one of the friction engaging mechanisms to rotate its particular layshaft, and by engaging the idler gear of a gear wheel pair whose layshaft is that particular layshaft to its shaft on which it is mounted by the gear engaging system, so as to rotate the mainshaft via that gear wheel pair from that particular layshaft.

6 Claims, 8 Drawing Figures

GEAR TRANSMISSION MECHANISM WITH MULTIPLE LAYSHAFTS

BACKGROUND OF THE INVENTION

The present invention relates to a gear transmission mechanism, and more particularly relates to a gear transmission mechanism which can be used in an automatic transmission for an automotive vehicle such as a passenger car.

Many automotive vehicles in these days are fitted with automatic transmissions. Such an automatic transmission typically includes a fluid torque converter and a gear transmission mechanism, the torque converter providing supply of rotational power to the gear transmission mechanism. The gear transmission mechanism, in turn, alters the speed ratio of the rotational power which it receives, and supplies said rotational power to a final drive device such as a differential device. Such gear transmission mechanism is capable of providing a plurality of different speed stages or speed ratios between its rotational power input member and its rotational power output member, and is controlled to provide one or another of these speed stages by a transmission control device, which receives information relating to the operational conditions of the vehicle incorporating the transmission, such as information on vehicle throttle opening and vehicle road speed for example, and which makes a decision as to what speed stage should be provided by the gear transmission mechanism, at each particular time.

Such a gear transmission mechanism, therefore, is required to provide a plurality of speed stages, which naturally should be of proper and appropriate ratios. Further, the gear transmission mechanism is required to be mounted in the vehicle, and to be compact. Particularly in the case that the vehicle is one in which the engine and transmission are mounted together in the front thereof transversely to the vehicle, which is a typical front wheel drive configuration or a so called FF configuration, the requirements for compactness of the gear transmission mechanism become very severe. Particularly, severe requirements are made for the gear transmission mechanism to be short in its axial length.

Further, as a matter of course such a gear transmission mechanism should provide a good driving feeling when shifting between the speed stages, without undue shift shock or over revving of the engine of the vehicle during shifting. The vehicle should have good drivability. Further, it is important that the durability of the gear transmission mechanism should be good, especially the durability of the friction engaging mechanisms thereof.

A gear transmission mechanism is typically usually used in one high speed stage much more than in the lower speed stages; this may be called the top speed stage. It is very important that the durability of the gear transmission mechanism in this so called top speed stage should be particularly good, since the gear transmission mechanism is kept in said top speed stage for such a large proportion of the time. Further, often a gear transmission mechanism in a modern vehicle is provided with a so called overdrive speed stage, which is a higher speed stage than the above defined top speed stage. Such an overdrive speed stage is used during expressway driving or the like. Since such an overdrive speed stage is also quite frequently used for long periods, it is also important that the durability of the gear transmission mechanism in this so called overdrive speed stage should be quite good.

SUMMARY OF THE INVENTION

Accordingly, it is the primary object of the present invention to provide a gear transmission mechanism which is compact and which is short in its axial length.

It is a further object of the present invention to provide such a gear transmission mechanism, which provides good transmission operation.

It is a further object of the present invention to provide such a gear transmission mechanism, which minimizes shift shock during shifting between its speed stages.

It is a further object of the present invention to provide such a gear transmission mechanism, which minimized torque shock and jerking action during shifting between its speed stages.

It is a further object of the present invention to provide such a gear transmission mechanism, which prevents engine racing during shifting between its speed stages.

It is a further object of the present invention to provide such a gear transmission mechanism, which has good durability.

It is a further object of the present invention to provide such a gear transmission mechanism, which especially provides good durability for its friction engaging mechanisms.

It is a further object of the present invention to provide such a gear transmission mechanism, which particularly had good durability with regard to its top speed stage which is used during normal driving.

It is a further object of the present invention to provide such a gear transmission mechanism, which further has good durability during an overdrive speed stage which is used during expressway driving or the like.

It is a yet further object of the present invention to provide such a gear transmission mechanism, which minimizes noise during its use in such a top speed stage.

It is a yet further object of the present invention to provide such a gear transmission mechanism, which minimizes vibration during its use in such a top speed stage.

It is a yet further object of the present invention to provide such a gear transmission mechanism, which minimizes noise during its use in such an overdrive speed stage.

It is a yet further object of the present invention to provide such a gear transmission mechanism, which minimizes vibration during its use in such an overdrive speed stage.

It is a yet further object of the present invention to provide such a gear transmission mechanism, which provides good drivability for the vehicle in which it is fitted.

According to the present invention, these and other objects are accomplished by a gear transmission mechanism for an automotive vehicle, comprising: (a) a power input shaft; (b) a plurality of combination assemblies, each comprising a layshaft and a selectively engagable friction engaging mechanism which can be selectively actuated, according to selective supply of an actuating signal thereto, so as either to rotationally drive said layshaft from said power input shaft, or to rotationally disengage said layshaft from said power input shaft; all said layshafts being substantially parallel; (c) a main shaft substantially parallel with all said layshafts; (d) means for engaging the gears; (e) a plurality of meshed pairs of gear wheels, each of said pairs comprising a main shaft gear mounted on said main shaft and a layshaft gear mounted on one of said layshafts; and, in each of said pairs of gear wheels, one of them being a fixed gear which is fixed to its shaft on which it is mounted, and the other being an idler gear which, according to the selective operation of said gear engaging means, either can be rotationally coupled to its shaft on which it is mounted, or can be left rotationally disengaged from its said shaft on which it is mounted; and (f) means for outputting rotational power from a member which rotates along with said main shaft.

According to such a structure, various gear ratios between said power input shaft and said member which rotates along with said main shaft can be obtained, by a particular one of said selectively engagable friction engaging mechanisms being engaged so as to rotate a particular one of said layshafts from said power input shaft, and by also engaging, by the gear engaging means, the idler gear one of some one pair of said pairs of gear wheels the layshaft relating to which pair is said particular one of said layshafts to its shaft on which it is mounted, so as to transmit rotational power from said particular one of said layshafts to said main shaft. In this transmission of rotational power, a characteristic gearing ratio is obtained which is determined by the ratio of diameters of the two gear wheels of said some one pair of gear wheels. If the various pairs of gear wheels have various different ratios of diameters, therefore, a variety of different gearing ratios may be obtained.

Further, according to a particular aspect of the present invention, these and other objects are more particularly accomplished by a gear transmission mechanism as described above, wherein, of the total plurality of speed stages obtainable between said power input shaft and said rotational power output means by selectively engaging one of said selectively engagable friction engaging mechanisms relating to a particular layshaft and the one of said idler gears which is included in that gear wheel pair the layshaft gear of which is mounted on said layshaft to its shaft on which it is mounted, no two consecutive speed stages are related to the same one of said layshafts.

According to such a structure, since consecutive speed stages, both in the ascending order and in the descending order, use different layshafts in every instance, it is possible, while a particular speed stage is engaged, to engage the idler wheel of the gear wheel pair which will be used for the next speed stage (either up or down) to its shaft on which it is mounted, as a preliminary before actually changing the speed stage; and this prior engagement will cause no problems and will be quite smooth. Thereafter, the actual changing of speed stage can be performed, merely by changing over the engagement and the non engagement conditions of the relevant pair of said selectively engagable friction engaging mechanisms.

Further, according to a particular aspect of the present invention, these and other objects are more particularly accomplished by such a gear transmission mechanism as first described above, wherein the number of said combination assemblies and of said layshafts is two, and wherein, considering in the order of magnitude of speed gearing ratio the total plurality of speed stages obtainable between said power input shaft and said rotational power output means by selectively engaging one of said selectively engagable friction engaging mechanisms relating to a particular layshaft and the one of said idler gears which is included in that gear wheel pair the layshaft gear of which is mounted on said layshaft to its shaft on which it is mounted, alternate ones of said speed stages relate to alternate ones of said layshafts.

This, of course, is the particular case of the previous concept, when the number of layshafts is two, as is the preferred case.

Further, according to a particular aspect of the present invention, these and other objects are more particularly and concretely accomplished by such a gear transmission mechanism as first described above, wherein said member which rotates along with said main shaft from which rotational power is outputted is a particular one of said idler gears which is rotatably mounted on one of said layshafts, its corresponding fixed gear being fixedly mounted on said main shaft.

According to such a structure, this particular one of said idler gears is conveniently used for two purposes: as an idler gear to provide a particular speed stage, and as a power output member.

Further, according to a particular aspect of the present invention, these and other objects are more particularly and concretely accomplished by such a gear transmission mechanism as just proximately described above, wherein the one of the total plurality of speed stages obtainable between said power input shaft and said rotational power output means by selectively engaging one of said selectively engagable friction engaging mechanisms relating to a particular layshaft and the one of said idler gears which is included in that gear wheel pair the layshaft gear of which is mounted on said layshaft to its shaft on which it is mounted, obtained by engaging said particular one of said idler gears to its own layshaft and by selectively engaging the one of said selectively engagable friction engaging mechanisms which relates to said own layshaft, is the highest of said speed stages.

According to such a structure, the power train for transmitting rotational power from said power input shaft to said means for outputting rotational power, in said highest of said speed stages, is the simplest, for any of the speed stages. Accordingly, the operation of the automotive vehicle in said highest speed stage, which in many cases is typically the speed stage in which the vehicle will be most used if said highest speed stage is the normally used speed stage, will cause a low amount of wear on the gear transmission mechanism, and a low amount of attendant noise and vibration.

Further, according to an alternative particular aspect of the present invention to the last mentioned one, these and other objects are more particularly accomplished by such a gear transmission mechanism as the penultimate one described above, wherein the one of the total plurality of speed stages obtainable between said power input shaft and said rotational power output means by selectively engaging one of said selectively engagable friction engaging mechanisms relating to a particular layshaft and the one of said idler gears which is included in that gear wheel pair the layshaft gear of which is mounted on said layshaft to its shaft on which it is mounted, obtained by engaging said particular one of said idler gears to its own layshaft and by selectively engaging the one of said selectively engagable friction engaging mechanisms which relates to said own layshaft, is the next to the highest of said speed stages.

According to such a structure, the power train for transmitting rotational power from said power input shaft to said means for outputting rotational power, in said next to the highest of said speed stages, is the simplest, for any of the speed stages. Accordingly, the operation of the automotive vehicle in said next to highest speed stage, which in many cases is typically the speed stage in which the vehicle will be most used if said next to highest speed stage is the normally used speed stage, will cause a low amount of wear on the gear transmission mechanism, and a low amount of attendant noise and vibration. Typically in such a case the highest speed stage will be an overdrive speed stage.

Further, according to a yet more particular aspect of the present invention, these and other objects are more particularly accomplished by such a gear transmission mechanism as penultimately described above, wherein said means for outputting rotational power from said particular one of said idler gears is a power receiving gear engaged therewith; and further comprising a top speed stage idler gear wheel which is rotatably mounted on a one of said layshafts other than said own layshaft, and which is selectively engagable thereto, said top speed stage idler gear wheel also being engaged to said power receiving gear.

According to such a structure, another gearing ratio between said power input shaft and said rotational power output means with a remarkable simple power transmission path is obtained simply by engaging said top speed stage idler gear wheel to said one layshaft, while taking care that said particular one of said idler gears is not being rotationally driven either by its shaft or by the fixed gear with which it is meshed. If it is arranged that the speed stage obtained in this way is higher than said highest speed stage, then this speed stage may be conveniently used as an overdrive speed stage; and in this fashion both the normally used speed stage and the overdrive speed stage may be arranged to have remarkably simple rotational power transmission paths, which is advantageous for reducing wear, vibration, and noise both during engagement of said normally used speed stage and during engagement of said overdrive speed stage.

Further, according to a particular aspect of the present invention, these and other objects are more particularly accomplished by a gear transmission mechanism as first described above, wherein all of said idler wheels are mounted on said layshafts and none of them are mounted on said main shaft.

This structure has particular contructional advantages in some circumstances, especially with regard to minimizing the axial length of the gear transmission mechanism and making it generally compact.

Further, according to an alternative particular aspect of the present invention, these and other objects are more particularly accomplished by a gear transmission mechanism as first described above, wherein some of said idler wheels are mounted on said layshafts and some of them are mounted on said main shaft.

This structure has particular constructional advantages in other circumstances, again especially with regard to minimizing the axial length of the gear transmission mechanism and making it generally compact.

BRIEF DESCRIPTION OF THE DRAWINGS

The present invention will now be shown and described with reference to several preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims.

In the drawings.

DETAILED DESCRIPTION OF THE PREFERRED EMBODIMENTS

Figure 1:
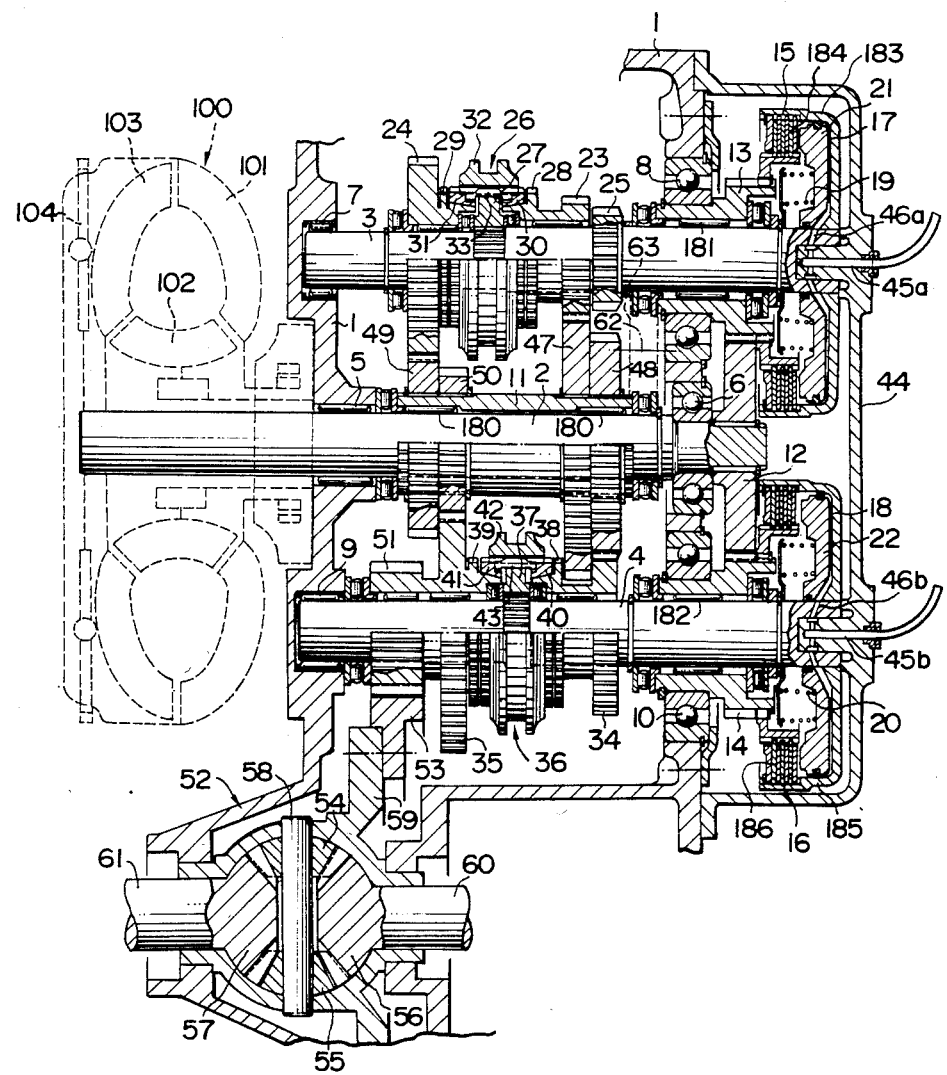
FIG. 1 is a vertical part sectional view taken through a gear transmission mechanism which is a first preferred embodiment of the gear transmission mechanism with multiple layshafts according to the present invention, somewhat distorted and idealized for purposes of explanation.
Figure 2:
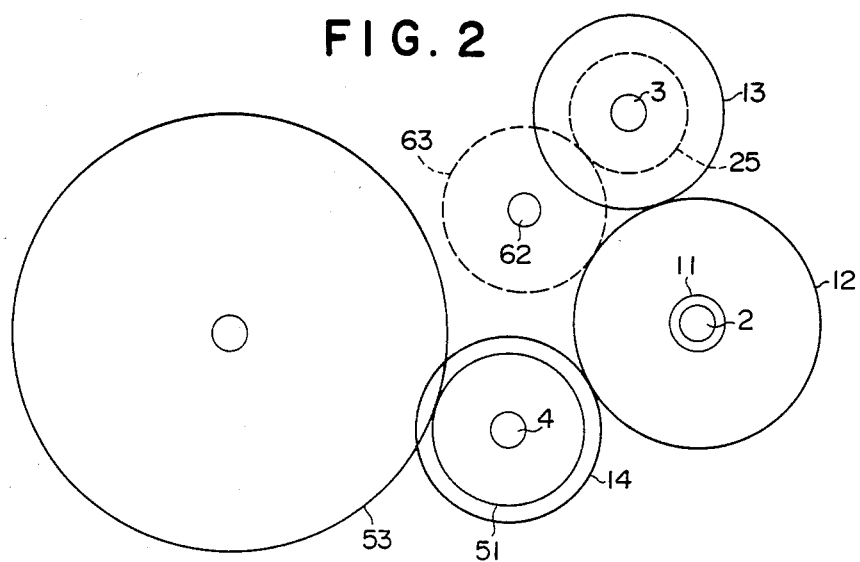
FIG. 2 is a schematic end on view showing the actual spatial distribution of the shafts and the gear wheels in the gear transmission mechanism which is the first preferred embodiment of the gear transmission mechanism with multiple layshafts according to the present invention shown in FIG. 1.

The present invention will now be described with reference to several preferred embodiments thereof, and with reference to the appended drawings. FIG. 1 is a part elevation, part vertical sectional view taken through a gear transmission mechanism which is a first preferred embodiment of the gear transmission mechanism with multiple layshafts according to the present invention, and FIG. 2 is a schematic end on view showing the actual spatial distribution of the shafts and the gear wheels in this gear transmission mechanism. Further, in FIG. 3 the layout and the interrelationships of the shafts and gear wheels and other devices of this gear transmission mechanism are shown. In these figures, the reference numeral 1 denotes the casing of the gear transmission mechanism and of a differential mechanism associated therewith, said gear transmission mechanism casing 1 being formed with an internal space. A hydraulic clutch cover 44 is fixed to the right hand side in FIG. 1 of the gear transmission mechanism casing 1. The gear transmission mechanism casing 1 supports a power input shaft 2 by a pair of coaxial bearings 5 and 6 so that the power input shaft 2 extends across the space within the gear transmission mechanism casing 1. Further, the gear transmission mechanism casing 1 supports a first/-third layshaft 3 by a pair of coaxial bearings 7 and 8 and also supports a second/fourth layshaft 4 by a pair of coaxial bearings 9 and 10, so that the first/third layshaft 3 and the second/fourth layshaft 4 extend across said space within the gear transmission mechanism casing 1, being parallel with one another and also being parallel with the power input shaft 2. The spatial arrangement of the power input shaft 2, the first/third layshaft 3, and the second/fourth layshaft 4 can be best seen in FIG. 2, which is an end on view of these shafts and of various gear wheels of the first embodiment of the gear transmission mechanism with multiple layshafts according to the present invention. Various thrust bearings are provided between the first/third layshaft 3 and the second-/fourth layshaft 4 and the gear transmission mechanism casing 1, for sustaining axial load on the first/third layshaft 3 and the second/fourth layshaft 4 and for preventing such axial load causing axial movement of the first/third layshaft 3 and the second/fourth layshaft 4 within the gear transmission mechanism casing 1; these thrust bearings are shown in the figure but are not particularly designated by any reference numerals. The right hand ends in FIG. 1 of the power input shaft 2, the first/third layshaft 3, and the second/fourth layshaft 4 project out from the gear transmission mechanism casing 1 to extend for a certain distance inside the hydraulic clutch cover 44. In FIG. 1, the central rotational axes of the power input shaft 2, the first/third layshaft 3, and the second/fourth layshaft 4 are shown as substantially coplanar, but in fact, as may be seen from FIG. 2, these axes are not coplanar at all. This distortion in FIG. 1 has been made for the purposes of convenience of explanation.

On the outside of the central portion of the power input shaft 2, i.e. on the portion of the power input shaft 2 within the gear transmission mechanism casing 1, there is fitted a main shaft 11, the inside cylindrical surface of which is supported on the outside cylindrical surface of the power input shaft 2 via needle roller bearings 180. Thus the main shaft 11 can freely rotate with respect to the power input shaft 2, about the same central axis. Again, various thrust bearings are provided between the main shaft 11 and the gear transmission mechanism casing 1, for sustaining axial load on the main shaft 11 and for preventing such axial load causing axial movement of the main shaft 11 within the gear transmission mechanism casing 1; these thrust bearings are again shown in the figure but are again not particularly designated by any reference numerals.

The left hand end in FIG. 1 of the power input shaft 2 also serves as the rotational power output shaft for a fluid torque converter 100. This fluid torque converter 100 is of a per se well known sort, and comprises a torque converter pump impeller 101 which is rotationally driven by the crankshaft of an internal combustion engine not shown in the figures, a torque converter stator member 102, a torque converter turbine member 103 which is rotationally coupled to the power input shaft 2, and a lock up clutch 104 of a per se well known sort which selectively rotationally connects together said torque converter pump impeller 101 and said torque converter turbine member 103 when selectively supplied with actuating fluid pressure. Thus, rotational power is inputted by said fluid torque converter 100 to the left hand end of the power input shaft 2 at all times when the internal combustion engine (not shown) is running.

Now the arrangements within the hydraulic clutch cover 44 on the right hand side in FIG. 1 of the gear transmission mechanism casing 1 will be described. On the right hand end in FIG. 1 of the power input shaft 2 there is fixed a power input gear 12, so that the power input gear 12 is rotationally coupled to the power input shaft 2 and is thus also rotationally driven by the torque converter turbine member 103 of the fluid torque converter 100 at all times when the internal combustion engine (not shown) is running. On the right hand end in FIG. 1 of the first/third layshaft 3 there is rotatably mounted a first/third layshaft driving gear 13 on needle roller bearings 181, and this first/third layshaft driving gear 13 is in constant mesh with the power input gear 12, so that again this first/third layshaft driving gear 13 is always being rotated by the power input gear 12 when the internal combustion engine (not shown) is running. Further, on the right hand end in FIG. 1 of the second/fourth layshaft 4 there is rotatably mounted a second/fourth layshaft driving gear 14 on needle roller bearings 182, and this second/fourth layshaft driving gear 14 is also in constant mesh with the power input gear 12, so that again this second/fourth layshaft driving gear 14 is always being rotated by the power input gear 12 when the internal combustion engine (not shown) is running.

Thus the power input gear 12, the first/third layshaft driving gear 13, and the second/fourth layshaft driving gear 14 are all housed within the hydraulic clutch cover 44. Further within the upper part of this hydraulic clutch cover 44 in FIG. 1 there is provided a first/third layshaft clutch 15, which selectively according to selective supply of actuating hydraulic fluid pressure thereto rotationally couples the first/third layshaft driving gear 13 to the first/third layshaft 3. In more detail, when the first/third layshaft clutch 15 is supplied with actuating hydraulic fluid pressure, said first/third layshaft clutch 15 rotationally couples together the first/third layshaft driving gear 13 and the first/third layshaft 3, so that the first/third layshaft 3 rotates along with the power input shaft 2, the power input gear 12, and the first/third layshaft driving gear 13; but when the first/third layshaft clutch 15 is not supplied with actuating hydraulic fluid pressure, then said first/third layshaft clutch 15 leaves the first/third layshaft driving gear 13 free to rotate by the meshing action of the power input gear 12 without said rotation being transmitted to the first/third layshaft 3. Similarly, within the lower part of the hydraulic clutch cover 44 in FIG. 1 there is provided a second/fourth layshaft clutch 16, which selectively according to selective supply of actuating hydraulic fluid pressure thereto rotationally couples the second-/fourth layshaft driving gear 14 to the second/fourth layshaft 4. In more detail, when the second/fourth layshaft clutch 16 is supplied with actuating hydraulic fluid pressure, said second/fourth layshaft clutch 16 rotationally couples together the second/fourth layshaft driving gear 14 and the second/fourth layshaft 4, so that the second/fourth layshaft 4 rotates along with the power input shaft 2, the power input gear 12, and the second-/fourth layshaft driving gear 14; but when the second-/fourth layshaft clutch 16 is not supplied with actuating hydraulic fluid pressure, then said second/fourth layshaft clutch 16 leaves the second/fourth layshaft driving gear 14 free to rotate by the meshing action of the power input gear 12 without said rotation being transmitted to the second/fourth layshaft 4.

The construction of the first/third layshaft clutch 15 is as follows. The first/third layshaft clutch 15 is constructed with an first clutch body 183 which slidingly receives a first piston element 21 which is biased to the right in FIG. 1 by a first return spring 19, a first hydraulic pressure chamber 17 being defined to the right of the first piston element 21 in FIG. 1. This first clutch body 183 is rotationally coupled to the first/third layshaft 3. When actuating hydraulic pressure is supplied to this first hydraulic pressure chamber 17 via a first hydraulic passage 45a formed through the hydraulic clutch cover 44 and via a first shaft passage 46a formed in the first/-third layshaft 3 which communicates between said first hydraulic passage 45a and said first hydraulic pressure chamber 17, then this hydraulic fluid pressure forces the first piston element 21 to the left as seen in FIG. 1 against the biasing action of the first return spring 19 which is overcome, so that this first piston element 21 presses against a plurality of first clutch plate elements 184 and squeezes them together. These first clutch plate elements 184 are formed as flat annuli which are sandwiched together. Alternate ones of these first clutch plate elements 184 are rotationally engaged by their outer peripheries to the first clutch body 183, and the other alternate ones of the first clutch plate elements 184 are rotationally engaged by their inner peripheries to a hub element, not designated by any particular reference number, which is rotationally engaged to the first/third layshaft driving gear 13. Thus, when these first clutch plate elements 184 are thus squeezed together by such supply of actuating hydraulic fluid pressure to the first/third layshaft clutch 15, they rotationally engage together, and thus rotationally couple the first clutch body 183 to the first/third layshaft driving gear 13, which means that the first/third layshaft driving gear 13 is rotationally engaged to the first/third layshaft 3. On the other hand, when actuating hydraulic fluid pressure is not supplied to the first hydraulic passage 45a to be supplied to the first hydraulic pressure chamber 17, then the first piston element 21 is shifted to the right in FIG. 1 by the biasing action of the first return spring 19, and the first clutch plate elements 184 are thus not squeezed together by the first piston element 21, and then one set of alternate ones of these first clutch plate elements 184 is substantially free to move with respect to the other set of alternate ones thereof, and hence the first/third layshaft driving gear 13 is substantially free to move with respect to the first/third layshaft 3.

The construction of the second/fourth layshaft clutch 16 is similar to that of the first/third layshaft clutch 15, and is as follows. The second/fourth layshaft clutch 16 is constructed with an second clutch body 185 which slidingly receives a second piston element 22 which is biased to the right in FIG. 1 by a second return spring 20, a second hydraulic pressure chamber 18 being defined to the right of the second piston element 22 in FIG. 1. This second clutch body 185 is rotationally coupled to the second/fourth layshaft 4. When actuating hydraulic pressure is supplied to this second hydraulic pressure chamber 18 via a second hydraulic passage 45b formed through the hydraulic clutch cover 44 and via a second shaft passage 46b formed in the second-/fourth layshaft 4 which communicates between said second hydraulic passage 45b and said second hydraulic pressure chamber 18, then this hydraulic fluid pressure forces the second piston element 22 to the left as seen in FIG. 1 against the biasing action of the second return spring 20 which is overcome, so that this second piston element 22 presses against a plurality of second clutch plate elements 186 and squeezes them together. These second clutch plate elements 186 are similarly formed as flat annuli which are sandwiched together. Alternate ones of these second clutch plate elements 186 are rotationally engaged by their outer peripheries to the second clutch body 185, and the other alternate ones of the second clutch plate elements 186 are rotationally engaged by their inner peripheries to a hub element, again not designated by any particular reference number, which is rotationally engaged to the second/fourth layshaft driving gear 14. Thus, when these second clutch plate elements 186 are thus squeezed together by such supply of actuating hydraulic fluid pressure to the second/fourth layshaft clutch 16, they rotationally engage together, and thus rotationally couple the second clutch body 185 to the second/fourth layshaft driving gear 14, which means that the second/fourth layshaft driving gear 14 is rotationally engaged to the second-/fourth layshaft 4. On the other hand, when actuating hydraulic fluid pressure is not supplied to the second hydraulic passage 45b to be supplied to the second hydraulic pressure chamber 18, then the second piston element 22 is shifted to the left in FIG. 1 by the biasing action of the second return spring 20, and the second clutch plate elements 186 are not thus squeezed together by the second piston element 22, and then one set of alternate ones of these second clutch plate elements 186 is substantially free to move with respect to the other set of alternate ones thereof, and hence the second/fourth layshaft driving gear 14 is substantially free to move with respect to the second/fourth layshaft 4.

Now the arrangements within the gear transmission mechanism casing 1 will be described.

On the first/third layshaft 3 there is fixedly mounted, within the gear transmission mechanism casing 1 at the right hand side in FIG. 1 thereof, a reverse driving gear 25 which is used for providing reverse gear as will be seen hereinafter. Further, on the first/third layshaft 3 to the left in the figures of this reverse driving gear 25 there are freely rotatably mounted a first speed layshaft idler gear 23 and a third speed layshaft idler gear 24, via needle roller bearings not designated by any particular reference numerals. A thrust bearing is provided between the third speed layshaft idler gear 24 and the first/third layshaft 3, for sustaining axial load on the third speed layshaft idler gear 24 and for preventing such axial load causing axial movement of the third speed layshaft idler gear 24 with respect to the first/third layshaft 3. Between the first speed layshaft idler gear 23 and the third speed layshaft idler gear 24 on the first/third layshaft 3 there is fitted a first/third synchronizer 26, which performs the function of synchronizing engagement of the first speed stage and of the third speed stage, as will be understood hereinafter. This first/third synchronizer 26 is of a per se well known sort, in fact being an inertia lock type Borg Warner synchromesh device. The first/third synchronizer 26 comprises a first/third clutch hub 27 which is fixedly mounted on the first/third layshaft 3, a set of first speed stage splines 28 provided integrally with the first speed layshaft idler gear 23 and a set of third speed stage splines 29 provided integrally with the third speed layshaft idler gear 24, a first speed stage synchronizer ring 30 which is engagable with the first speed stage splines 28 and a third speed stage synchronizer ring 31 which is engagable with the third speed stage splines 29, a first/third hub sleeve 32 which is engaged by splines with the first/third clutch hub 27, and a first/third shift key 33 which is engaged by a spline with the first/third hub sleeve 32. The function of this first/third synchronizer 26 is to rotationally couple either the first speed layshaft idler gear 23 or the third speed layshaft idler gear 24 or neither of them to the first/third layshaft 3, according as its first/third hub sleeve 32 respectively is shifted to its rightmost position in the figures, is shifted to its leftmost position in the figures, or is shifted to an intermediate or middle position.

On the second/fourth layshaft 4 there are freely rotatably mounted a second speed layshaft idler gear 34 and a fourth speed layshaft idler gear 35, via needle roller bearings again not designated by any particular reference numerals. A thrust bearing is provided between the fourth speed layshaft idler gear 35 and the second/fourth layshaft 4, for sustaining axial load on the fourth speed layshaft idler gear 35 and for preventing such axial load causing axial movement of the fourth speed layshaft idler gear 35 with respect to the second/fourth layshaft 4. Between the second speed layshaft idler gear 34 and the fourth speed layshaft idler gear 35 on the second/fourth layshaft 4 there is fitted a second/fourth synchronizer 36, which performs the function of synchronizing engagement of the second speed stage and of the fourth speed stage, as will be understood hereinafter. This second/fourth synchronizer 36 is of a construction similar to the first/third synchronizer 26, and is of a per se well known sort, in fact also being an inertia lock type Borg Warner synchromesh device. The second/fourth synchronizer 36 comprises a second clutch hub 37 which is fixedly mounted on the second/fourth layshaft 4, a set of second speed stage splines 38 provided integrally with the second speed layshaft idler gear 34 and a set of fourth speed stage splines 39 provided integrally with the fourth speed layshaft idler gear 35, a second speed stage synchronizer ring 40 which is engagable with the second speed stage splines 38 and a fourth speed stage synchronizing ring 41 which is engagable with the fourth speed stage splines 39, a second/fourth hub sleeve 42 which is engaged by splines with the second clutch hub 37, and a second/fourth shift key 43 which is engaged by a spline with the second/fourth hub sleeve 42. The function of this second/fourth synchronizer 36 is to rotationally couple either the second speed layshaft idler gear 34 or the fourth speed layshaft idler gear 35 or neither of them to the second/fourth layshaft 4, according as its second/fourth hub sleeve 42 respectively is shifted to its rightmost position in the figures, is shifted to its leftmost position in the figures, or is shifted to an intermediate or middle position.

On the main shaft 11, which as has been stated previously is rotatably fitted over the power input shaft 2, there are fixedly mounted four gear wheels: in order from the left to the right of the figures, a third speed mainshaft fixed gear 49 which is in constant mesh with the third speed layshaft idler gear 24; a fourth speed mainshaft fixed gear 50 which is in constant mesh with the fourth speed layshaft idler gear 35; a first speed mainshaft fixed gear 47 which is in constant mesh with the first speed layshaft idler gear 23; and a second speed mainshaft fixed gear 48 which is in constant mesh with the second speed layshaft idler gear 34. These gear wheels are splined to the main shaft 11, although this is not particularly shown in the figures.

On the second/fourth layshaft 4 there is also provided as freely rotatable a power output gear 51, which in this first preferred embodiment of the gear transmission mechanism with multiple layshafts according to the present invention is constructed integrally with the fourth speed layshaft idler gear 35 on its left hand side in the figures. A thrust bearing is provided between the power output gear 51 and hence also the fourth speed layshaft idler gear 35 and the gear transmission mechanism casing 1, for sustaining axial load on the power output gear 51 and the fourth speed layshaft idler gear 35 and for preventing such axial load causing axial movement of the power output gear 51 and the fourth speed layshaft idler gear 35 with respect to the second/fourth layshaft 4 or the gear transmission mechanism casing 1; this thrust bearing is again shown in the figure but is again not particularly designated by any reference numeral. This power output gear 51 is in constant mesh with a differential power input ring gear 53 of a differential gear mechanism 52, which is of a per se well known sort. The differential gear mechanism 52 comprises a casing which in this particular construction is formed in a unitary fashion with the gear transmission mechanism casing 1, and within this casing there is rotatably supported about a horizontal axis (both in the figures and in actual installation) a differential bevel gear case 59, to which said differential power input ring gear 53 is fixed so as to rotate said differential bevel gear case 59. Perpendicular to the rotational axis of the differential bevel gear case 59 there is fixed within said differential bevel gear case 59 a differential bevel gear shaft 58, on which there are rotatably mounted a pair of differential bevel gears 54 and 55. Also supported rotatably by the casing of the differential gear mechanism 52 as coaxial with the rotational axis of the differential bevel gear case 59 there are provided left and right vehicle half shafts or axles 60 and 61, to the inner ends of which there are fixed a differential bevel gear 56 and a differential bevel gear 57, respectively. These differential bevel gears 56 and 57 are each in constant mesh with each of the rotating differential bevel gears 54 and 55. The operation of such a differential mechanism as this differential gear mechanism 52 is per se well known. In FIG. 1, the rotational axis of the differential power input ring gear 53, the differential bevel gear case 59, and the half shafts 60 and 61 has been shown as substantially coplanar with the central axes of the power input shaft 2, the first/third layshaft 3, and the second/fourth layshaft 4, but in fact, as may be seen from FIG. 2, these axes are not coplanar at all. This distortion in FIG. 1 has again been made for the purposes of convenience of explanation.

Finally, within the gear transmission mechanism casing 1 on a reverse idler gear shaft 62 which is supported within the gear transmission mechanism casing 1 as parallel to the power input shaft 2 and the first/third layshaft 3 and the second/fourth layshaft 4 but which is only shown in FIG. 1 in partial sketch form because in the view of FIG. 1 it lies partly, behind various other parts therein, there is rotatably and slidably mounted a reverse idler gear 63, which, again, is only shown in FIG. 1 in partial sketch form because in the view of FIG. 1 it lies partly behind various other parts therein. Arrangements of a per se well known sort, not shown in the figures, are provided for shifting this reverse idler gear 63 to and fro in the left and right directions in FIGS. 1 and 3 on the reverse idler gear shaft 62; and, when the reverse idler gear 63 is in its most rightwards position in FIGS. 1 and 3 on the reverse idler gear shaft 62, said reverse idler gear 63 does not mesh with any other gear wheels and is therefore free to rotate; but, when the reverse idler gear 63 is in its most leftwards position in FIGS. 1 and 3 on the reverse idler gear shaft 62, said reverse idler gear 63 meshes with the reverse driving gear 25 and with the second speed mainshaft fixed gear 48, so as to provide a reverse speed stage, as will be explained later.

In FIG. 2, the actual spatial layout of the power input shaft 2, the first/third layshaft 3, the second/fourth layshaft 4, the reverse idler gear shaft 62, and the differential power input ring gear 53 can be seen, from a point of view to the left of FIG. 1 looking rightwards in that figure. It can be seen from this figure that in fact the view shown in FIG. 1 is somewhat idealized; that is, is somewhat distorted so as to make it appear that the rotational axis of the differential power input ring gear 53 is coplanar with the power input shaft 2, the first/third layshaft 3, and the second/fourth layshaft 4; this has been done for convenience of explanation.

Now the operation of the gear transmission mechanism shown in FIGS. 1 through 3, which is the first preferred embodiment of the gear transmission mechanism with multiple layshafts according to the present invention, will be explained. In this connection, it should be understood that selective supply or non supply of actuating hydraulic fluid pressure to the first/third layshaft clutch 15 and to the second/fourth layshaft clutch 16, via the first hydraulic passage 45a and the second hydraulic passage 45b, is suitably performed according to operational parameters of the vehicle of which this gear transmission mechanism forms part from a control system for the automatic transmission of which the shown gear transmission mechanism according to the first preferrred embodiment of the present invention forms parts; and this control system will not be described herein with regard to its construction, because said control system does not directly form part of the present invention, and the functional explanation of its operation which will be given herein is sufficient for understanding of the principles of operation of the gear transmission mechanism with multiple layshafts according to the present invention. The movement leftwards and rightwards in FIG. 1 of the first/third hub sleeve 32 of the first/third synchronizer 26, of the second/fourth hub sleeve 42 of the second/fourth synchronizer 36, and of the reverse idler gear 63 on the reverse idler gear shaft 62, is also suitably selectively performed (using appropriate forks or the like of a per se well known sort) by this control system, according to operational parameters of the vehicle of which this gear transmission mechanism forms part, and this operation of said control system will also be functionally explained hereinafter, but will not be constructionally explained.

First the positions and engagement conditions of each of the first/third synchronizer 26, the second/fourth synchronizer 36, the first/third layshaft clutch 15, and the second/fourth layshaft clutch 16 will be explained, during the engagement of each of the speed stages which can be provided by the gear transmission mechanism according to the first embodiment of the present invention explained above, i.e during the engagement of the neutral speed stage, the first forward speed stage, the second forward speed stage, the third forward speed stage, the fourth forward speed stage, and the reverse speed stage; and then the sequences of shifting and of engagement and disengagement operations of these means which are employed in the various possible operations of shifting between these speed stages will be explained.

In the neutral speed stage, the first/third hub sleeve 32 of the first/third synchronizer 26 is set to its intermediate position by the above mentioned transmission control system, the second/fourth hub sleeve 42 of the second/fourth synchronizer 36 is also set to its intermediate position by said control system, and neither one of the first/third layshaft clutch 15 and the second/fourth layshaft clutch 16 is supplied with actuating hydraulic fluid pressure by said control system, so that neither the first/third layshaft clutch 15 nor the second/fourth layshaft clutch 16 is engaged, but both of them are free to slip. In this operational condition, the rotation of the power input shaft 2 which as explained above is always rotationally driven by the crankshaft of the internal combustion engine (not shown) via the fluid torque converter 100 is not positively transmitted to the first/third layshaft 3 or to the second/fourth layshaft 4, since the first/third layshaft clutch 15 and also the second/fourth layshaft clutch 16 are disengaged; and, even if some of this rotation is transmitted to the first/third layshaft 3 or the second/fourth layshaft 4, since the first/third synchronizer 26 and the second/fourth synchronizer 36 are disengaged, therefore no substantial rotational force is transmitted to the power output gear 51, and hence no substantial rotational force is supplied to the differential gear mechanism 52. Thus the gear transmission mechanism according to the first preferred embodiment of the present invention functions in its neutral speed stage.

In the first speed stage, the first/third hub sleeve 32 of the first/third synchronizer 26 is set to its rightwardly displaced position by the above mentioned transmission control system, the second/fourth hub sleeve 42 of the second/fourth synchronizer 36 is set to its intermediate position by said control system, and the first/third layshaft clutch 15 is supplied with actuating hydraulic fluid pressure by said control system via the first hydraulic passage 45a, while the second/fourth layshaft clutch 16 is not supplied with actuating hydraulic fluid pressure by said control system; so that said first/third layshaft clutch 15 is engaged according to supply of hydraulic fluid pressure to its first hydraulic pressure chamber 17, but said second/fourth layshaft clutch 16 is not engaged. In this operational condition, the rotation of the power input shaft 2 which as explained above is always rotationally driven by the crankshaft of the internal combustion engine (not shown) via the fluid torque converter 100 is not positively transmitted to the second/fourth layshaft 4, since the second/fourth layshaft clutch 16 is disengaged; and, even if some of this rotation is transmitted to the second/fourth layshaft 4, since the second/fourth synchronizer 36 is disengaged, therefore no substantial rotational force is transmitted thence to the power output gear 51. However, the rotation of the power input shaft 2 is transmitted through the power input gear 12, through the first/third layshaft driving gear 13, through the first/third layshaft clutch 15 which as explained above is engaged, to the first/third layshaft 3, and thence is transmitted via the first/third synchronizer 26 to the first speed layshaft idler gear 23 now engaged therewith which transmits said rotation to the first speed mainshaft fixed gear 47, thus rotating the main shaft 11 and all the gear wheels mounted thereon. Thus in particular the fourth speed mainshaft fixed gear 50 is rotated by the main shaft 11 on which it is fixedly mounted, and this fourth speed mainshaft fixed gear 50 rotates the fourth speed layshaft idler gear 35 which in this first preferred embodiment is integral with the power output gear 51, thus transmitting output rotational power to the differential gear mechanism 52. Thus the gear transmission mechanism according to the first preferred embodiment of the present invention functions in its first speed stage.

In the second speed stage, the first/third hub sleeve 32 of the first/third synchronizer 26 is set to its intermediate position by the above mentioned transmission control system, the second/fourth hub sleeve 42 of the second/fourth synchronizer 36 is set to its rightwardly displaced position by said control system, and the first/third layshaft clutch 15 is not supplied with actuating hydraulic fluid pressure by said control system, while the second/fourth layshaft clutch 16 is supplied with actuating hydraulic fluid pressure by said control system via the second hydraulic passage 45b; so that said first/third layshaft clutch 15 is not engaged, but said second/fourth layshaft clutch 16 is engaged according to supply of hydraulic fluid pressure to its second hydraulic pressure chamber 18. In this operational condition, the rotation of the power input shaft 2 which as explained above is always rotationally driven by the crankshaft of the internal combustion engine (not shown) via the fluid torque converter 100 is not positively transmitted to the first/third layshaft 3, since the first/third layshaft clutch 15 is disengaged; and, even if some of this rotation is transmitted to the first/third layshaft 3, since the first/third synchronizer 26 is disengaged, therefore no substantial rotational force is transmitted thence to any gear wheel or to the power output gear 51. However, the rotation of the power input shaft 2 is transmitted through the power input gear 12, through the second/fourth layshaft driving gear 14, through the second/fourth layshaft clutch 16 which as explained above is engaged, to the second/fourth layshaft 4, and thence is transmitted via the second/fourth synchronizer 36 to the second speed layshaft idler gear 34 now engaged therewith which transmits said rotation to the second speed mainshaft fixed gear 48, thus rotating the main shaft 11 and all the gear wheels mounted thereon. Thus in particular again the fourth speed mainshaft fixed gear 50 is rotated by the main shaft 11 on which it is fixedly mounted, and this fourth speed mainshaft fixed gear 50 rotates the fourth speed layshaft idler gear 35 which in this first preferred embodiment is integral with the power output gear 51, thus transmitting output rotational power to the differential gear mechanism 52. Thus the gear transmission mechanism according to the first preferred embodiment of the present invention functions in its second speed stage.

In the third speed stage, the first/third hub sleeve 32 of the first/third synchronizer 26 is set to its leftwardly displaced position by the above mentioned transmission control system, the second/fourth hub sleeve 42 of the second/fourth synchronizer 36 is set to its intermediate position by said control system, and the first/third layshaft clutch 15 is supplied with actuating hydraulic fluid pressure by said control system via the first hydraulic passage 45a, while the second/fourth layshaft clutch 16 is not supplied with actuating hydraulic fluid pressure by said control system; so that said first/third layshaft clutch 15 is engaged according to supply of hydraulic fluid pressure to its first hydraulic pressure chamber 17, but said second/fourth layshaft clutch 16 is not engaged. In this operational condition, the rotation of the power input shaft 2 which as explained above is always rotationally driven by the crankshaft of the internal combustion engine (not shown) via the fluid torque converter 100 is not positively transmitted to the second/fourth layshaft 4, since the second/fourth layshaft clutch 16 is disengaged; and, even if some of this rotation is transmitted to the second/fourth layshaft 4, since the second/fourth synchronizer 36 is disengaged, therefore no substantial rotational force is transmitted thence to any gear wheel mounted thereon or to the power output gear 51. However, the rotation of the power input shaft 2 is transmitted through the power input gear 12, through the first/third layshaft driving gear 13, through the first/third layshaft clutch 15 which as explained above is engaged, to the first/third layshaft 3, and thence is transmitted via the first/third synchronizer 26 to the third speed layshaft idler gear 24 now engaged therewith which transmits said rotation to the third speed mainshaft fixed gear 49, thus rotating the main shaft 11 and all the gear wheels mounted thereon. Thus in particular the fourth speed mainshaft fixed gear 50 is rotated by the main shaft 11 on which it is fixedly mounted, and this fourth speed mainshaft fixed gear 50 rotates the fourth speed layshaft idler gear 35 which in this first preferred embodiment is integral with the power output gear 51, thus transmitting output rotational power to the differential gear mechanism 52. Thus the gear transmission mechanism according to the first preferred embodiment of the present invention functions in its third speed stage.

In the fourth speed stage, the first/third hub sleeve 32 of the first/third synchronizer 26 is set to its intermediate position by the above mentioned transmission control system, the second/fourth hub sleeve 42 of the second/fourth synchronizer 36 is set to its lefttwardly displaced position by said control system, and the first/third layshaft clutch 15 is not supplied with actuating hydraulic fluid pressure by said control system, while the second/fourth layshaft clutch 16 is supplied with actuating hydraulic fluid pressure by said control system via the second hydraulic passage 45b; so that said first/third layshaft clutch 15 is not engaged, but said second/fourth layshaft clutch 16 is engaged according to supply of hydraulic fluid pressure to its second hydraulic pressure chamber 18. In this operational condition, the rotation of the power input shaft 2 which as explained above is continuously driven by the crankshaft of the internal combustion engine (not shown) via the fluid torque converter 100 is not positively transmitted to the first/third layshaft 3, since the first/third layshaft clutch 15 is disengaged; and, even if some of this rotation is transmitted to the first/third layshaft 3, since the first/third synchronizer 26 is disengaged, therefore no substantial rotational force is transmitted thence to any gear wheel or to the power output gear 51. However, the rotation of the power input shaft 2 is transmitted through the power input gear 12, through the second/fourth layshaft driving gear 14, through the second/fourth layshaft clutch 16 which as explained above is engaged, to the second/fourth layshaft 4, and thence is directly transmitted via the second/fourth synchronizer 36 to the fourth speed layshaft idler gear 35 now engaged therewith which in this first preferred embodiment is integral with the power output gear 51. Thus engine output rotational power is directly transmitted to the differential gear mechanism 52, without the intervention of any gear wheels (except the power input gear 12 and the second/fourth layshaft driving gear 14). Thus the gear transmission mechanism according to the first preferred embodiment of the present invention functions in its fourth speed stage, which is a directly connected speed stage.

In the reverse speed stage, the first/third hub sleeve 32 of the first/third synchronizer 26 is set to its intermediate position by the above mentioned transmission control system, the second/fourth hub sleeve 42 of the second/fourth synchronizer 36 is set to its intermediate position by said control system, and the first/third layshaft clutch 15 is supplied with actuating hydraulic fluid pressure by said control system via the first hydraulic passage 45a, while the second/fourth layshaft clutch 16 is not supplied with actuating hydraulic fluid pressure by said control system; so that said first/third layshaft clutch 15 is engaged according to supply of hydraulic fluid pressure to its first hydraulic pressure chamber 17, but said second/fourth layshaft clutch 16 is not engaged. In this operational condition, the rotation of the power input shaft 2 which as explained above is always rotationally driven by the crankshaft of the internal combustion engine (not shown) via the fluid torque converter 100 is not positively transmitted to the second/fourth layshaft 4, since the second/fourth layshaft clutch 16 is disengaged; and, even if some of this rotation is transmitted to the second/fourth layshaft 4, since the second/fourth synchronizer 36 is disengaged, therefore no substantial rotational force is transmitted thence to any gear wheel mounted thereon or to the power output gear 51. Further, in this reverse speed stage, the reverse idler gear 63 is shifted in the leftwards direction in FIG. 1 along the reverse idler gear shaft 62 by the abovementioned control system via a fork or the like of a per se well known sort, so that said reverse idler gear 63 engages both with the reverse driving gear 25 fixed on the first/third layshaft 3 and with the second speed mainshaft fixed gear 48 fixed on the main shaft 11. Thus, the rotation of the power input shaft 2 is transmitted through the power input gear 12, through the first/third layshaft driving gear 13, through the first/third layshaft clutch 15 which as explained above is engaged, to the first/third layshaft 3, and thence is transmitted via the reverse driving gear 25 and the reverse idler gear 63 to the second speed mainshaft driven gear 48 engaged therewith which transmits said rotation to the main shaft 11, thus rotating this main shaft 11 and all the gear wheels mounted thereon in the reverse rotational sense to that in which said main shaft 11 is rotated in all the other gear stages whose operation is explained above (since one more gear wheel, the reverse idler gear 63, is involved in the rotational force transmission path). Thus in particular the fourth speed mainshaft fixed gear 50 is reversedly rotated by the main shaft 11 on which it is fixedly mounted, and this fourth speed mainshaft fixed gear 50 rotates the fourth speed layshaft idler gear 35 which in this first preferred embodiment is integral with the power output gear 51, thus transmitting output rotational power in a reverse sense to the case of the other speed stages mentioned above to the differential gear mechanism 52. Thus the gear transmission mechanism according to the first preferred embodiment of the present invention functions in its reverse speed stage.

Now the sequences of shifting and of engagement and disengagement operations of these means, i.e. of the first/third synchronizer 26, the second/fourth synchronizer 36, the first/third layshaft clutch 15, the second/fourth layshaft clutch 16, and the reverse idler gear 63, which are employed in the various possible operations of shifting between these speed stages will be explained.

First, in the case of upshifting from the neutral speed stage to the first speed stage, first the gear transmission mechanism according to the first preferred embodiment of the present invention is in the condition described above with respect to the engagement of the neutral speed stage. From this condition, first as a preparatory action the first/third hub sleeve 32 of the first/third synchronizer 26 is shifted by the control system from its central or intermediate position to its rightward position, so as to rotationally connect the first/third layshaft 3 and the first speed layshaft idler gear 23, while still keeping both the first/third layshaft clutch 15 and the second/fourth layshaft clutch 16 in their states of not being supplied with actuating hydraulic fluid pressure and not being engaged. It should be noted that this shifting of the first/third hub sleeve 32 of the first/third synchronizer 26 can be performed smoothly at this time, because as explained above the first/third layshaft 3 and the first speed layshaft idler gear 23 are not substantially rotating at this time because the first/third layshaft clutch 15 and the second/fourth layshaft clutch 16 are disengaged, or even if these members are rotating somewhat due to dragging of the first/third layshaft clutch 15 and/or the second/fourth layshaft clutch 16 this rotation is not substantially powered and can be easily overcome by the per se well known synchronizing action of the first/third synchronizer 26. After this preparatory action of engaging the first/third synchronizer 26 and the first/third layshaft 3 to the first speed layshaft idler gear 23 has been accomplished satisfactorily, then the actual engagement of the first speed stage from the neutral speed stage, i.e. the actual change of speed stage, is smoothly and progressively accomplished by the above mentioned control system engaging the first/third layshaft clutch 15 in a smooth and controlled manner by progressive supply of hydraulic fluid pressure through the first hydraulic passage 45a to the first hydraulic pressure chamber 17 of said first/third layshaft clutch 15. However, the control system keeps the second/fourth layshaft clutch 16 disengaged by not supplying any actuating hydraulic fluid pressure to its second hydraulic pressure chamber 18. Thus the transition to the above described positions and engagement conditions of the various parts for providing the first speed stage is made.

It will be understood that, mutatis mutandis, this process will be suitable for the shifting from the neutral speed stage to any forward speed stage (in particular, to the second forward speed stage, in which second speed stage often, depending upon operational conditions of the vehicle incorporating the shown gear transmission mechanism, it may be desired to start the vehicle from rest): in general, first as a preparatory action the control system shifts the appropriate one of the first/third synchronizer 26 and the second/fourth synchronizer 36 to engage the appropriate one of the first speed layshaft idler gear 23, the third speed layshaft idler gear 24, the second speed layshaft idler gear 34, and the fourth speed layshaft idler gear 35 for the desired speed stage with the appropriate one of the first/third layshaft 3 and the second/fourth layshaft 4 which passes therethrough, and subsequently in order actually to engage said desired speed stage the first/third layshaft clutch 15 or the second/fourth layshaft clutch 16 is smoothly and progressively engaged by said control system by supply of actuating hydraulic fluid pressure thereto, while, correspondingly, the second/fourth layshaft clutch 16 or the first/third layshaft clutch 15 is kept disengaged.

Next, in the case of upshifting from the first speed stage to the second speed stage, first the gear transmission mechanism according to the first preferred embodiment of the present invention is in the condition described above with respect to the engagement of the first speed stage. From this condition, first as a preparatory action the second/fourth hub sleeve 42 of the second/fourth synchronizer 36 is shifted by the control system from its central or intermediate position to its rightward position, so as to rotationally connect the second/fourth layshaft 4 and the second speed layshaft idler gear 34, while still keeping the first/third layshaft clutch 15 in its state of being supplied with actuating hydraulic fluid pressure so as to keep it engaged, and keeping the second/fourth layshaft clutch 16 in its state of not being supplied with actuating hydraulic fluid pressure and not being engaged. It should be noted that this shifting of the second/fourth hub sleeve 42 of the second/fourth synchronizer 36 can be performed smoothly at this time, because as explained above the second/fourth layshaft 4 is substantially free to rotate at this time because the second/fourth layshaft clutch 16 is disengaged, or even if this member is rotating somewhat due to dragging of the second/fourth layshaft clutch 16 this rotation is not substantially powered and can be easily overcome by the per se well known synchronizing action of the second/fourth synchronizer 36, so as to match the rotational speeds of the second/fourth layshaft 4 and the second speed layshaft idler gear 34. After this preparatory action of engaging the second/fourth synchronizer 36 and the second/fourth layshaft 4 to the second speed layshaft idler gear 34 has been accomplished satisfactorily, then the actual engagement of the second speed stage from the first speed stage, i.e. the actual change of speed stage, is smoothly and progressively accomplished by the above mentioned control system disengaging the first/third layshaft clutch 15 fairly sharply, and simultaneously at an appropriate timing (appropriate to an upshifting action) engaging the second/fourth layshaft clutch 16 in a smooth and controlled manner by progressive supply of hydraulic fluid pressure through the second hydraulic passage 45b to the second hydraulic pressure chamber 18 of said second/fourth layshaft clutch 16. This changeover of the engagement and disengagement conditions of the first/third layshaft clutch 15 and the second/fourth layshaft clutch 16 is made in an analogous manner to the change of speed stage in a conventional automatic transmission incorporating a conventional type of gear transmission mechanism which comprises a plurality of hydraulic fluid pressure actuated friction engaging mechanisms such as hydraulically actuated clutches and hydraulically actuated brakes; in such a conventional automatic transmission, it is common practice when shifting speed stages to disengage the relevant hydraulic fluid pressure actuated friction engaging mechanisms which should be disengaged from the engaged condition fairly sharply by fairly sharp cessation of the supply of hydraulic fluid pressure thereto, but to engage the relevant hydraulic fluid pressure actuated friction engaging mechanisms which should be engaged from the disengaged condition rather smoothly and progressively by smooth and progressive commencement of the supply of hydraulic fluid pressure thereto. This procedure, as is per se well known, soften the shift shock, and ensures good durability of the parts of the transmission, especially the friction engaging mechanisms, by preventing the engine racing during speed shifting, as well as preventing torque shock or jerk being transmitted along the power train of the vehicle, which could deteriorate the mechanisms of the transmission, as well as providing a poor driving feeling to the vehicle and impairing its drivability. Finally, after the disengagement of the first/third layshaft clutch 15 and the engagement of the second/fourth layshaft clutch 16 have been quite completed, at a later stage as a concluding action the first/third hub sleeve 32 of the first/third synchronizer 26 is shifted by the control system from its rightward position to its central or intermediate position, so as to rotationally disconnect the first/third layshaft 3 and the first speed layshaft idler gear 23. Thus the transition to the above described positions and engagement conditions of the various parts for providing the second speed stage is made.

Next, in the case of upshifting from the second speed stage to the third speed stage, first the gear transmission mechanism according to the first preferred embodiment of the present invention is in the condition described above with respect to the engagement of the second speed stage. From this condition, first as a preparatory action the first/third hub sleeve 32 of the first/third sychronizer 26 is shifted by the control system from its central or intermediate position to its leftward position, so as to rotationally connect the first/third layshaft 3 and the third speed layshaft idler gear 24, while still keeping the second/fourth layshaft clutch 16 in its state of being supplied with actuating hydraulic fluid pressure so as to keep it engaged, and keeping the first/third layshaft clutch 15 in its state of not being supplied with actuating hydraulic fluid pressure and not being engaged. It should be noted that this shifting of the first/third hub sleeve 32 of the first/third synchronizer 26 can be performed smoothly at this time, because as explained above the first/third layshaft 3 is substantially free to rotate at this time because the first/third layshaft clutch 15 is disengaged, or even if the first/third layshaft 3 is rotating somewhat due to dragging of the first/third layshaft clutch 15 this rotation is not substantially powered and can be easily overcome by the per se well known synchronizing action of the first/third synchronizer 26, as to match the rotational speeds of the first/third layshaft 3 and the third speed layshaft idler gear 24. After this preparatory action of engaging the first/third synchronizer 26 and the first/third layshaft 3 to the third speed layshaft idler gear 24 has been accomplished satisfactorily, then the actual engagement of the third speed stage from the second speed stage, i.e. the actual change of speed stage, is smoothly and progressively accomplished by the above mentioned control system disengaging the second/fourth layshaft clutch 16 fairly sharply, and simultaneously at an appropriate timing (appropriate for an upshifting action) engaging the first/third layshaft clutch 15 in a smooth and controlled manner by progressive supply of hydraulic fluid pressure through the first hydraulic passage 45a to the first hydraulic pressure chamber 17 of said first/third layshaft clutch 15. This changeover of the engagement and disengagement conditions of the first/third layshaft clutch 15 and the second/fourth layshaft clutch 16 is again made in an analogous manner to the change of speed stage in a conventional automatic transmission as incorporating a conventional type of gear transmission mechanism which comprises a plurality of hydraulic fluid pressure actuated friction engaging mechanisms such as hydraulically actuated clutches and hydraulically actuated brakes. Finally, after the disengagement of the second/fourth layshaft clutch 16 and the engagement of the first/third layshaft clutch 15 have been quite completed, at a later stage as a concluding action the second/fourth hub sleeve 42 of the second/fourth synchronizer 36 is shifted by the control system from its rightward position to its central or intermediate position, so as to rotationally disconnect the second/fourth layshaft 4 and the second speed layshaft idler gear 34. Thus the transition to the above described positions and engagement conditions of the various parts for providing the third speed stage is made.

Next, in the case of upshifting from the third speed stage to the fourth speed stage, first the gear transmission mechanism according to the first preferred embodiment of the present invention is in the condition described above with respect to the engagement of the third speed stage. From this condition, first as a preparatory action the second/fourth hub sleeve 42 of the second/fourth synchronizer 36 is shifted by the control system from its central or intermediate position to its leftward position, so as to rotationally connect the second/fourth layshaft 4 and the fourth speed layshaft idler gear 35, while still keeping the first/third layshaft clutch 15 in its state of being supplied with actuating hydraulic fluid pressure so as to keep it engaged, and keeping the second/fourth layshaft clutch 16 in its state of not being supplied with actuating hydraulic fluid pressure and not being engaged. It should be noted that this shifting of the second/fourth hub sleeve 42 of the second/fourth synchronizer 36 can be performed smoothly at this time, because as explained above the second/fourth layshaft 4 is substantially free to rotate at this time because the second/fourth layshaft clutch 16 is disengaged, or even if the second/fourth layshaft 4 is rotating somewhat due to dragging of the second/fourth layshaft clutch 16 this rotation is not substantially powered and can be easily overcome by the per se well known synchronizing action of the second/fourth synchronizer 36, so as to match the rotational speeds of the second/fourth layshaft 4 and the fourth speed layshaft idler gear 35. After this preparatory action of engaging the second/fourth synchronizer 36 and the second/fourth layshaft 4 to the fourth speed layshaft idler gear 35 has been accomplished satisfactorily, then the actual engagement of the fourth speed stage from the third speed state, i.e. the actual change of speed stage, is smoothly and progressively accomplished by the above mentioned control system disengaging the first/third layshaft clutch 15 fairly sharply, and simultaneously at an appropriate timing (again appropriate for an upshifting action) engaging the second/fourth layshaft clutch 16 in a smooth and controlled manner by progressive supply of hydraulic fluid pressure through the second hydraulic passage 45b to the second hydraulic pressure chamber 18 of said second/fourth layshaft clutch 16. This changeover of the engagement and disengagement conditions of the first/third layshaft clutch 15 and the second/fourth layshaft clutch 16 is again made in an analogous manner to the change of speed stage in a conventional automatic transmission incorporating a conventional type of gear transmission mechanism which comprises a plurality of hydraulic fluid pressure actuated friction engaging mechanisms such as hydraulically actuated clutches and hydraulically actuated brakes. Finally, after the disengagement of the first/third layshaft clutch 15 and the engagement of the second/fourth layshaft clutch 16 have been quite completed, at a later stage as a concluding action the first/third hub sleeve 32 of the first/third synchronizer 26 is shifted by the control system from its leftward position to its central or intermediate position, so as to rotationally disconnect the first/third layshaft 3 and the third speed layshaft idler gear 24. Thus the transition to the above described positions and engagement conditions of the various parts for providing the fourth speed stage is made.

Next, in the case of downshifting from the fourth speed stage to the third speed stage, first the gear transmission mechanism according to the first preferred embodiment of the present invention is in the condition described above with respect to the engagement of the fourth speed stage. From this condition, first as a preparatory action the first/third hub sleeve 32 of the first/third synchronizer 26 is shifted by the control system from its central or intermediate position to its leftward position, so as to rotationally connect the first/third layshaft 3 and the third speed layshaft idler gear 24, while still keeping the second/fourth layshaft clutch 16 in its state of being supplied with actuating hydraulic fluid pressure so as to keep it engaged, and keeping the first/third layshaft clutch 15 in its state of not being supplied with actuating hydraulic fluid pressure and not being engaged. It should be noted that this shifting of the first/third hub sleeve 32 of the first/third synchronizer 26 can be performed smoothly at this time, because as explained above the first/third layshaft 3 is substantially free to rotate at this time because the first/third layshaft clutch 15 is disengaged, or even if the first/third layshaft 3 is rotating somewhat due to dragging of the first/third layshaft clutch 15 this rotation is not substantially powered and can be easily overcome by the per se well known synchronizing action of the first/third synchronizer 26, so as to match the rotational speeds of the first/third layshaft 3 and the third speed layshaft idler gear 24. After this preparatory action of engaging the first/third synchronizer 26 and the first/third layshaft 3 to the third speed layshaft idler gear 24 has been accomplished satisfactorily, then the actual engagement of the third speed stage from the fourth speed stage, i.e the actual change of speed stage, is smoothly and progressively accomplished by tha above mentioned control system disengaging the second/fourth layshaft clutch 16 fairly sharply, and simultaneously at an appropriate timing engaging the first/third layshaft clutch 15 in a smooth and controlled manner (appropriate, this time, to a downshifting action) by progressive supply of hydraulic fluid pressure through the first hydraulic passage 45a to the first hydraulic pressure chamber 17 of said first/third layshaft clutch 15. This changeover of the engagement and disengagement conditions of the first/third layshaft clutch 15 and the second/fourth layshaft clutch 16 is again made in an analogous manner to the change of speed stage in a conventional automatic transmission incorporating a conventional type of gear transmission mechanism which comprises a plurality of hydraulic fluid pressure actuated friction engaging mechanisms such as hydraulically actuated clutches and hydraulically actuated brakes. Finally, after the disengagement of the second/fourth layshaft clutch 16 and the engagement of the first/third layshaft clutch 15 have been quite completed, at a later stage as a concluding action the second/fourth hub sleeve 42 of the second/fourth synchronizer 36 is shifted by the control system from its leftward position to its central or intermediate position, so as to rotationally disconnect the second/fourth layshaft 4 and the fourth speed layshaft idler gear 35. Thus the transition to the above described positions and engagement conditions of the various parts for providing the third speed stage is made.

Next, in the case of downshifting from the third stage to the second speed stage, first the gear transmission mechanism according to the first preferred embodiment of the present invention is in the condition described above with respect to the engagement of the third speed stage. From this condition, first as a preparatory action the second/fourth hub sleeve 42 of the second/fourth synchronizer 36 is shifted by the control system from its central or intermediate position to its rightward position, so as to rotationally connect the second/fourth layshaft 4 and the second speed layshaft idler gear 34, while still keeping the first/third layshaft clutch 15 in its state of being supplied with actuating hydraulic fluid pressure so as to keep it engaged, and keeping the second/fourth layshaft clutch 16 in its state of not being supplied with actuating hydraulic fluid pressured and not being engaged. It should be noted that this shifting of the second/fourth hub sleeve 42 of the second/fourth synchronizer 36 can be performed smoothly at this time, because as explained above the second/fourth layshaft 4 is substantially free to rotate at this time because the second/fourth layshaft clutch 16 is disengaged, or even if this member is rotating somewhat due to dragging of the second/fourth layshaft clutch 16 this rotation is not substantially powered and can be easily overcome by the per se well known synchronizing action of the second/fourth synchronizer 36, so as to match the rotational speeds of the second/fourth layshaft 4 and the second speed layshaft idler gear 34. After this preparatory action of engaging the second/fourth synchronizer 36 and the second/fourth layshaft 4 to the second speed layshaft idler gear 34 has been accomplished satisfactorily, then the actual engagement of the second speed stage from the third speed stage, i.e. the actual change of speed stage, is smoothly and progressively accomplished by the above mentioned control system disengaging the first/third layshaft clutch 15 fairly sharply, and simultaneously at an appropriate timing (appropriate to a downshifting action) engaging the second/fourth layshaft clutch 16 in a smooth and controlled manner by progressive supply of hydraulic fluid pressure through the second hydraulic 45b to the second hydraulic pressure chamber 18 of said second/fourth layshaft clutch 16. This changeover of the engagement and disengagement conditions of the first/third layshaft clutch 15 and the second/fourth layshaft clutch 16 is made in an analogous manner to the change of speed stage in a conventional automatic transmission incorporating a conventional type of gear transmission mechanism which comprises a plurality of hydraulic fluid pressure actuated friction engaging mechanisms such as hydraulically actuated clutches and hydraulically actuated brakes. Finally, after the disengagement of the first/third layshaft clutch 15 and the engagement of the second/fourth layshaft clutch 16 have been quite completed, at a later stage as a concluding action the first/third hub sleeve 32 of the first/third synchronizer 26 is shifted by the control system from its leftward position to its central or intermediate position, so as to rotationally disconnect the first/third layshaft 3 and the third speed layshaft idler gear 24. Thus the transition to the above described positions and engagement conditions of the various parts for providing the second speed stage is made.

Next, in the case of downshifting from the second speed stage to the first speed stage, first the gear transmission mechanism according to the first preferred embodiment of the present invention is in the condition described above with respect to the engagement of the second speed stage. From this condition, first as a preparatory action the first/third hub sleeve 32 of the first/third synchronizer 26 is shifted by the control system from its central or intermediate position to its rightward position, so as to rotationally connect the first/third layshaft 3 and the first speed layshaft idler gear 23, while still keeping the second/fourth layshaft clutch 16 in its state of being supplied with actuating hydraulic fluid pressure so as to keep it engaged, and keeping the first/third layshaft clutch 15 in its state of not being supplied with actuating hydraulic fluid pressure and not being engaged. It should be noted that this shifting of the first/third hub sleeve 32 of the first/third synchronizer 26 can be performed smoothly at this time, because as explained above the first/third layshaft 3 is substantially free to rotate at this time because the first/third layshaft clutch 15 is disengaged, or even if the first/third layshaft 3 is rotating somewhat due to dragging of the first/third layshaft clutch 15 this rotation is not substantially powered and can be easily overcome by the per se well known synchronizing action of the first/third synchronizer 26, so as to match the rotational speeds of the first/third layshaft 3 and the third speed layshaft idler gear 24. After this preparatory action of engaging the first/third synchronizer 26 and the first/third layshaft 3 to the first speed layshaft idler gear 23 has been accomplished satisfactorily, then the actual engagement of the first speed stage from the second speed stage, i.e. the actual change of speed stage, is smoothly and progressively accomplished by the above mentioned control system disengaging the second/fourth layshaft clutch 16 fairly sharply, and simultaneously at an appropriate timing engaging the first/third layshaft clutch 15 in a smooth and controlled manner (appropriate again, this time, to a downshifting action) by progressive supply of hydraulic fluid pressure through the first hydraulic passage 45a to the first hydraulic pressure chamber 17 of said first/third layshaft clutch 15. This changeover of the engagement and disengagement conditions of the first/third layshaft clutch 15 and the second/fourth layshaft clutch 16 is again made in an analogous manner to the change of speed stage in a conventional automatic transmission incorporating a conventional type of gear transmission mechanism which comprises a plurality of hydraulic fluid pressure actuated friction engaging mechanisms such as hydraulically actuated clutches and hydraulically actuated brakes. Finally, after the disengagement of the second/fourth layshaft clutch 16 and the engagement of the first/third layshaft clutch 15 have been quite completed, at a later stage as a concluding action the second/fourth hub sleeve 42 of the second/fourth synchronizer 36 is shifted by the control system from its rightward position to its central or intermediate position, so as to rotationally disconnect the second/fourth layshaft 4 and the second speed layshaft idler gear 34. Thus the transition to the above described positions and engagement conditions of the various parts for providing the first speed stage is made.

Next, in the case of downshifting from the first speed stage to the neutral speed stage, first the gear transmission mechanism according to the first preferred embodiment of the present invention is in the condition described above with respect to the engagement of the first speed stage. From this condition, the above mentioned control system disengages the first/third layshaft clutch 15 by cessation of supply of hydraulic fluid pressure through the first hydraulic passage 45a to the first hydraulic pressure chamber 17 of said first/third layshaft clutch 15. The second/fourth layshaft clutch 16 is already disengaged, of course. Finally, after the disengagement of the first/third layshaft clutch 15 has been quite completed, at a later stage as a concluding action the first/third hub sleeve 32 of the first/third synchronizer 26 is shifted by the control system from its rightward position to its central or intermediate position, so as to rotationally disconnect the first/third layshaft 3 and the first speed layshaft idler gear 23. Thus the transition to the above described positions and engagement conditions of the various parts for providing the neutral speed stage is made. It will be understood that, mutatis mutandis, this process will be suitable for the shifting from any forward speed stage to the neutral speed stage: in general, first the control system disengages whichever one of the first/third layshaft clutch 15 and the second/fourth layshaft clutch 16 is engaged, and subsequently the control system returns whichever of the first/third synchronizer 26 and the second/fourth synchronizer 36 is not in its central or intermediate position to its intermediate position.

Finally, in the case of shifting from the neutral speed stage to the reverse speed stage, first the gear transmission mechanism according to the first preferred embodiment of the present invention is in the condition described above with respect to the engagement of the neutral speed stage. From this condition, first as a preparatory action the reverse idler gear 63 is shifted by the control system from its rightward position on the reverse idler gear shaft 62 to its leftward position, so as to mesh both with the reverse driving gear 25 and the second speed mainshaft fixed gear 48, while said control system still keeps both the first/third layshaft clutch 15 and the second/fourth layshaft clutch 16 in their states of not being supplied with actuating hydraulic fluid pressure and not being engaged. It should be noted that this shifting of the reverse idler gear 63 on the reverse idler gear shaft 62 and its engagement with the reverse driving gear 25 and the second speed mainshaft fixed gear 48 can be performed smoothly at this time, because as explained above the reverse driving gear 25 with the first/third layshaft 3 and the second speed mainshaft fixed gear 48 with the main shaft 11 are not substantially rotating at this time because the first/third layshaft clutch 15 and the second/fourth layshaft clutch 16 are both disengaged, or even if these members are rotating somewhat due to dragging of the first/third layshaft clutch 15 and/or the second/fourth layshaft clutch 16 this rotation is not substantially powered and can be easily overcome by the pushing action of the control system on the reverse idler gear 63. After this preparatory action of engaging the reverse idler gear 63 to the reverse driving gear 25 and the second speed mainshaft fixed gear 48 has been accomplished satisfactorily, then the actual engagement of the reverse speed stage from the neutral speed stage, i.e. the actual change of speed stage, is smoothly and progressively accomplished by the above mentioned control system engaging the first/third layshaft clutch 15 in a smooth and controlled manner by progressive supply of hydraulic fluid pressure through the first hydraulic passage 45a to the first hydraulic pressure chamber 17 of said first/third layshaft clutch 15. However, the control system keeps the second/fourth layshaft clutch 16 disengaged by not supplying any actuating hydraulic fluid pressure to its second hydraulic pressure chamber 18. Thus the transition to the above described positions and engagement conditions of the various parts for providing the reverse speed stage is made.

It will be understood that, mutatis mutandis, the process explained above for shifting from forward speed stages to the neutral speed stage will also be suitable for the shifting from the reverse speed stage to the neutral speed stage: however also, of course, in addition the reverse idler gear 63 is also required to be shifted leftwards along the reverse idler gear shaft 62 so as to come out of meshing with the reverse driving gear 25 and the second speed mainshaft fixed gear 48, after both the first/third layshaft clutch 15 and the second/fourth layshaft clutch 16 have been disengaged by the control system.

Now, the various ratios provided by the gear transmission mechanism with multiple layshafts according to this first preferred embodiment of the present invention between the power input shaft 2 and the half shaft or axle 60 and/or the half shaft or axle 61 in the various speed stages available from said gear transmission mechanism, i.e. the final drive or reduction ratios provided thereby, will be given, in terms of the number of teeth on each of the gear wheels of said gear transmission mechanism. If the symbol "A" represents the number of teeth on the power input gear 12, the symbol "B" represents the number of teeth on the first/third layshaft driving gear 13 and also on the second/fourth layshaft driving gear 14 which is taken in this example as having the same number of teeth as the first/third layshaft driving gear 13 although this is not to be considered as limitative of the present invention in any way, the symbol "C" represents the number of teeth on the first speed layshaft idler gear 23, the symbol "D" represents the number of teeth on the first speed mainshaft fixed gear 47, the symbol "E" represents the number of teeth on the fourth speed mainshaft fixed gear 50, the symbol "F" represents the number of teeth on the fourth speed layshaft idler gear 35, the symbol "G" represents the number of teeth on the power output gear 51, the symbol "H" represents the number of teeth on the differential power input ring gear 53, the symbol "I" represents the number of teeth on the second speed layshaft idler gear 34, the symbol "J" represents the number of teeth on the second speed mainshaft fixed gear 48, the symbol "K" represents the number of teeth on the third speed layshaft idler gear 24, the symbol "L" represents the number of teeth on the third speed mainshaft fixed gear 49, and the symbol "M" represents the number of teeth on the reverse driving gear 25, then the final drive or reduction ratio provided by the gear transmission mechanism according to the present invention when it is set to its first speed stage is (B/A) * (D/C) * (F/E) * (H/G); the final drive or reduction ratio provided by the gear transmission mechanism according to the present invention when it is set to its second speed stage is (B/A) * (J/I) * (F/E) * (H/G); the final drive or reduction ratio provided by the gear transmission mechanism according to the present invention when it is set to its third speed stage is (B/A) * (L/K) * (F/E) * (H/G); the final drive or reduction ratio provided by the gear transmission mechanism according to the present invention when it is set to its fourth speed stage is (B/A) * (H/G); and the final drive or reduction ratio provided by the gear transmission mechanism according to the present invention when it is set to its reverse speed stage is (B/A) * (J/M) * (F/E) * (H/G).

In the shown first preferred embodiment of the gear transmission mechanism with multiple layshafts according to the present invention, in fact, the numbers of teeth on these gear wheels are as follows: the value of A, i.e. the number of teeth on the power input gear 12, is 47; the value of B, i.e. the number of teeth on the first/third layshaft driving gear 13 and also on the second/fourth layshaft driving gear 14, is 33; the value of C, i.e. the number of teeth on the first speed layshaft idler gear 23, is 25; the value of D, i.e. the number of teeth on the first speed mainshaft fixed gear 47, is 55; the value of E, i.e. the number of teeth on the fourth speed mainshaft fixed gear 50, is 31; the value of F, i.e. the number of teeth on the fourth speed layshaft idler gear 35, is 49; the value of G, i.e. the number of teeth on the power output gear 51, is 20; the value of H, i.e. the number of teeth on the differential power input ring gear 53, is 65; the value of I, i.e. the number of teeth on the second speed layshaft idler gear 34, is 33; the value of J, i.e. the number of teeth on the second shaft speed mainshaft fixed gear 48, is 47; the value of K, i.e. the number of teeth on the third speed layshaft idler gear 24, is 42; the value of L, i.e. the number of teeth on the third speed mainshaft fixed gear 49, is 38; and the value of M, i.e. the number of teeth on the reverse driving gear 25, is 20. With these values for the numbers of teeth on the various gear wheels, the values for the final drive or reduction ratios are as follows: the final drive or reduction ratio in the first speed stage is 7.93517; the final drive or reduction ratio in the second speed stage is 5.13710; the final drive or reduction ratio in the third speed stage is 3.26338; the final drive or reduction ratio in the fourth speed stage is 2.28191; and the final drive or reduction ratio in the reverse speed stage is 8.83690. This particular selection gives a good set of final drive or reduction ratios for a vehicle having an internal combustion engine of relatively small displacement. As will be clear to one skilled in the art, however, this particular example of the numbers of teeth on each of the gears is not to be considered as limitative of the present invention, since it is quite within the ability of one of ordinary skill in the art, based upon the disclosure herein, to alter the numbers of gear teeth on these wheels in order to provide other desired final drive or reduction ratios.

According to this construction, it will be seen that either one of the first/third layshaft 3 and the second/fourth layshaft 4 can be selectively driven from the power input shaft 2, and that an appropriate one of the first speed layshaft idler gear 23, the second speed layshaft idler gear 34, the third speed layshaft idler gear 24, or the fourth speed layshaft idler gear 35 can be simultaneously rotationally coupled to its respective layshaft, so as to drive the main shaft 11 at an appropriate rotational speed depending on the combination of the number of teeth on said layshaft idler gear and the number of teeth on the one of the first speed mainshaft fixed gear 47, the second speed mainshaft fixed gear 48, the third speed mainshaft fixed gear 49, and the fourth speed mainshaft fixed gear 50 which is in constant mesh therewith. By this rotation of the main shaft 11 and of the fourth speed mainshaft fixed gear 50 which is coupled thereto, in this first preferred embodiment, the fourth speed layshaft idler gear 35 and the power output gear 51 formed integrally therewith thereby rotate at an appropriate rotational speed, and thus said power output gear 51 drives the differential power input ring gear 53 of the differential gear mechanism 52 to output rotational power at an appropriate final drive or reduction ratio. Further, it will be seen that (in a forward speed stage) while the one of the first/third layshaft 3 and the second/fourth layshaft 4 which is relevant to that speed stage is being driven from the power input shaft 2 by the engagement of its appropriate clutch, either of the two layshaft idler gears mounted on the other layshaft may be freely engaged to said other layshaft, in preparation for the next forward speed stage desired to be engaged, whether said speed stage be one speed stage higher or one speed stage lower than the currently engaged speed stage; this is because the forward speed stages provided by the shown gear transmission mechanism, from the first speed stage to the fourth speed stage, utilize gear pairs which alternate between one of them being mounted on the the first/third layshaft 3 and one of them being mounted on the second/fourth layshaft 4. Thus shifting from one speed stage to the next desired speed stage, either up or down, can be accomplished merely by exchanging the engagement and disengagement conditions of the first/third layshaft clutch 15 and the second/fourth layshaft clutch 16. Of course, this depends upon the fact that in the operation of an automatic transmission utilizing this gear transmission mechanism it is never necessary to shift directly between the first speed stage and the third speed stage, or between the second speed stage and the fourth speed stage. Finally, according to the shown construction, it will be realized that the axial length of this first embodiment of the gear transmission mechanism with multiple layshafts according to the present invention is remarkably short. Accordingly this gear transmission mechanism with multiple layshafts is particularly suitable for utilization in a vehicle in which the combination of the engine and the transmission is transversely mounted in the front thereof, for example a front engine front wheel drive vehicle (a so called FF vehicle).

Figure 3:
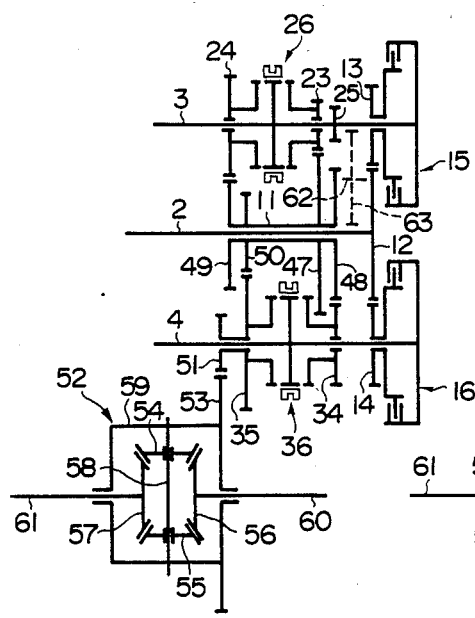
FIG. 3 is a schematic skeleton diagram showing the layout of the shafts and gear wheels and other devices of the gear transmission mechanism which is the first preferred embodiment of the gear transmission mechanism with multiple layshafts according to the present invention shown in FIG. 1, and showing their interrelationships.
Figure 5:
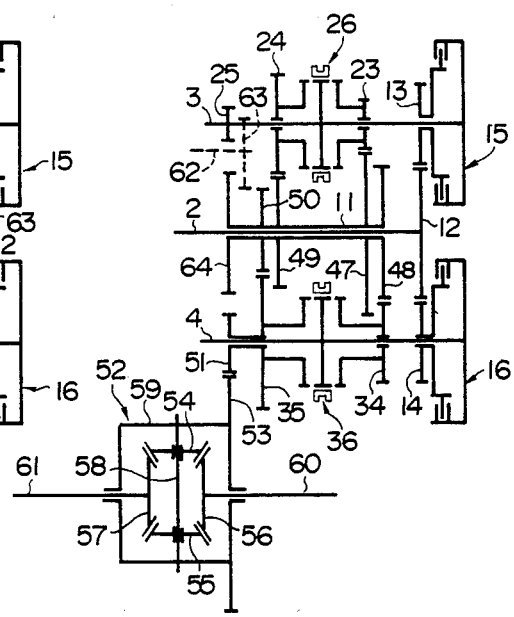
FIG. 5 is a schematic skeleton diagram, similar to FIG. 3, showing the layout of the shafts and gear wheels and other devices of the gear transmission mechanism which is the second preferred embodiment of the gear transmission mechanism with multiple layshafts according to the present invention shown in FIG. 4, and showing their interrelationships.
Figure 4:
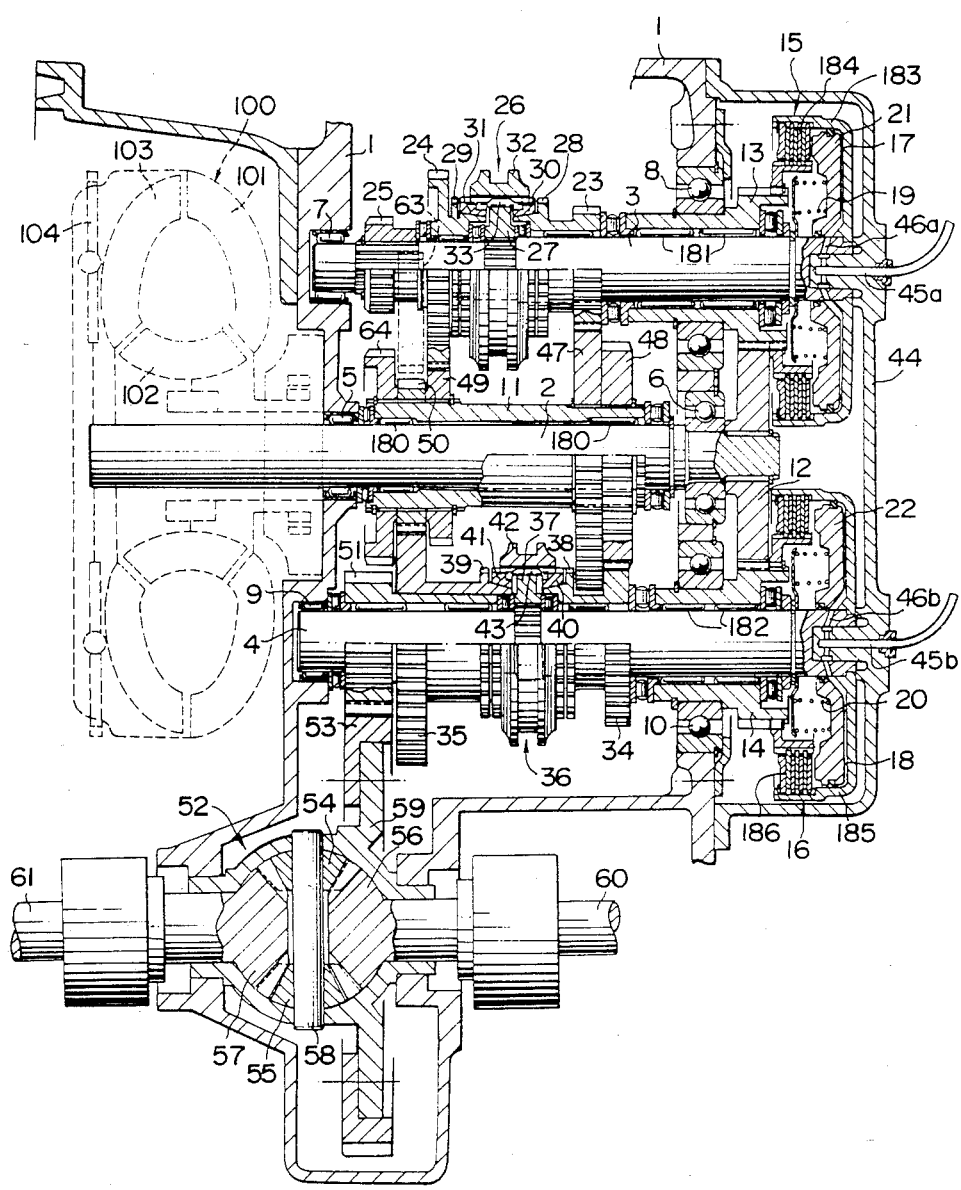
FIG. 4 is a vertical part sectional view, similar to FIG. 1, also somewhat distorted and idealized for purposes of explanation, taken through a gear transmission mechanism which is a second preferred embodiment of the gear transmission mechanism with multiple layshafts according to the present invention.

In FIGS. 4 and 5, there is shown a second preferred embodiment of the gear transmission mechanism with multiple layshafts according to the present invention, in fashions similar to FIGS. 1 and 3, respectively. In FIGS. 4 and 5, parts, apertures, and spaces of the second preferred embodiment shown, which correspond to parts, apertures, and spaces of the first preferred embodiment of the present invention shown in FIGS. 1 and 3, and which have the same functions, are designated by the same reference numerals and symbols as in those figures.

In this second preferred embodiment, the only significant difference from the first embodiment of the present invention shown in FIGS. 1 through 3 is the arrangements for provision of the reverse speed stage. In fact, the order as seen in the figures of the arrangement of the third speed mainshaft fixed gear 49 and the fourth speed mainshaft gear 50 on the main shaft 11 is reversed, and corresponding to this the dimensions as shown in FIG. 4 of some of the gear wheels and other structures of the gear transmission mechanism are slightly changed from the corresponding dimensions in the first embodiment as shown in FIG. 1; but these differences are not significant, as they do not affect the principles of functioning of the gear transmission mechanism. Although the power output gear 51 in this second embodiment is not actually formed integrally with the fourth speed layshaft idler gear 35, it is still fixed with respect thereto. However, with regard to the arrangements for the provision of the reverse speed stage, they are as follows. The reverse driving gear 25 is now, in this second preferred embodiment, fixedly mounted at a new location on the first/third layshaft 3 towards its left hand end, and opposing this reverse driving gear 25 there is now provided a special reverse speed mainshaft fixed gear 64. The combination of the reverse idler gear shaft 62 and the reverse idler gear 63 which again is slidably and rotatably mounted thereon is still located behind the first/third layshaft 3 and the main shaft 11 as seen from the point of view of FIG. 4, but is now located towards the left ends thereof in the figure, in contradistinction to its position in the first preferred embodiment. In this second preferred embodiment, therefore, when reverse speed stage is engaged and according to this the reverse idler gear 63 is shifted to the lft as seen in figures on the reverse idler gear shaft 62 so as to mesh with the reverse driving gear 25 and the reverse speed mainshaft fixed gear 64, thus the second speed mainshaft fixed gear 48 is not used for transmitting reverse sense rotation to the main shaft 11 from the reverse driving gear 25 via the reverse idler gear 63, as was the case in the first preferred embodiment, but instead the specially provided reverse speed mainshaft fixed gear 64 is used instead. The details of the operation of this second preferred embodiment will be easily understood by one of ordinary skill in the art, based upon the above disclosure; and this second preferred embodiment of the gear transmission mechanism with multiple layshafts according to the present invention exhibits the same advantages as does the first preferred embodiment shown in FIGS. 1 to 3. Further, this second preferred embodiment allows greater freedom in selection of the reverse speed reduction ratio or final drive ratio, since the special reverse speed mainshaft fixed gear 64 is employed for providing said reverse speed stage, instead of using the second speed mainshaft fixed gear 48 therefor.

Figure 6:
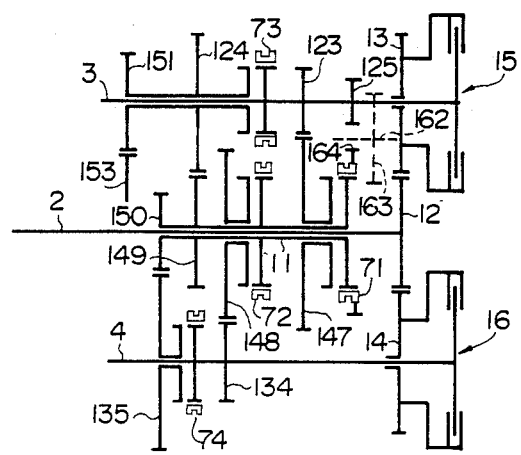
FIG. 6 is a schematic skeleton diagram, similar to FIGS. 3 and 5, showing the layout of the shafts and gear wheels and other devices of a gear transmission mechanism which is a third preferred embodiment of the gear transmission mechanism with multiple layshafts according to the present invention, and showing their interrelationships.

In FIG. 6, there is shown a skeleton view which gives the layout and the interrelationships of the shafts and gear wheels and other devices of a third preferred embodiment of the gear transmission mechanism with multiple layshafts according to the present invention, in a fashion similar to FIGS. 3 and 5 which related to the first and second embodiments respectively. In FIG. 6, parts of this third preferred embodiment shown, which correspond to parts of the first and second preferred embodiments shown in FIGS. 1 through 5, and which have the same functions, are designated by the same reference numerals as in those figures; and parts of this third preferred embodiment which are analogous in their functions to parts of the first and second preferred embodiments shown in FIGS. 1 through 5, but whose actual arrangement is different, are designated by the same reference numerals as in those figures, but increased by one hundred. No detailed structural diagram like FIG. 1 for the first preferred embodiment or FIG. 4 for the second preferred embodiment is given for this third preferred embodiment, nor is any end on view similar to FIG. 2 for the first preferred embodiment of the various shafts and wheels thereof given, because, based upon the disclosure herein and by analogy with the views shown in FIGS. 1 and 4 which relate to said previously explained embodiments, one of ordinary skill in the art will be well able to conceive of such details for himself.

In this figure, first, it should be understood that the differential gear mechanism, which is of course present in this third preferred embodiment as it is in the first and second embodiments, is not particularly shown, except for its differential power input ring gear 153, which is partially shown. The casing of the gear transmission mechanism and of a differential mechanism associated therewith, which was denoted by the reference numeral 1 in FIGS. 1 and 4, is not shown either; and nor is the hydraulic clutch cover previously denoted as 44, a similar clutch cover to which however actually in a similar manner to the previous cases is fixed to the right hand side of the gear transmission mechanism casing. Again, the gear transmission mechanism casing supports a power input shaft 2 by a pair of coaxial bearings, and also supports a first/third layshaft 3 by a pair of coaxial bearings and a second/fourth layshaft 4 by another pair of coaxial bearings, so that the first/third layshaft 3 and the second/fourth layshaft 4 extend across the space within the gear transmission mechanism casing, being parallel with one another and also being parallel with the power input shaft 2. Various thrust bearings are as before of course provided between the first/third layshaft 3 and the second/fourth layshaft 4 and the gear transmission mechanism casing for sustaining axial load on the first/third layshaft 3 and the second/fourth layshaft 4 and for preventing such axial load causing axial movement of the first/third layshaft 3 and the second/fourth layshaft 4 within the gear transmission mechanism casing; these thrust bearings are not shown in the figure. The right hand ends in FIG. 6 of the power input shaft 2, the first/third layshaft 3, and the second/fourth layshaft 4 project out from the gear transmission mechanism casing so as to extend for a certain distance inside the hydraulic clutch cover.

On the outside of the central portion of the power input shaft 2, i.e. on the portion of the power input shaft 2 within the gear transmission mechanism casing, there is fitted a main shaft 11, the inside cylindrical surface of which is supported on the outside cylindrical surface of the power input shaft 2 via needle roller bearings which are not shown. Thus the main shaft 11 can freely rotate with respect to the power input shaft 2, about the same central axis. Again, various thrust bearings are provided between the main shaft 11 and the gear transmission mechanism casing, for sustaining axial load on the main shaft 11 and for preventing such axial load causing axial movement of the main shaft 11 within the gear transmission mechanism casing 1; these thrust bearings are again not shown in the figure.

The left hand end in FIG. 6 of the power input shaft 2 also serves as the rotational power output shaft for a fluid torque converter, none of the arrangements relating to which are shown in the figure, but which is of course similar to the fluid torque converter 100 shown with relation to the first and second preferred embodiments in FIGS. 1 and 4. Thus, rotational power is inputted by said fluid torque converter to the left hand end in FIG. 6 of the power input shaft 2 at all times when the internal combustion engine (not shown) of the vehicle is running.

The arrangements within the hydraulic clutch cover on the right hand side in FIG. 6 of the gear transmission mechanism casing will now be described in outline; they are substantially the same as in the first and second preferred embodiments shown in FIGS. 1 through 5.

On the right hand end in FIG. 6 of the power input shaft 2 there is fixed a power input gear 12, so that the power input gear 12 is rotationally coupled to the power input shaft 2 and is thus also rotationally driven by the torque converter (not shown) at all times when the internal combustion engine (also not shown) is running. On the right hand end in FIG. 6 of the first/third layshaft 3 there is rotatably mounted a first/third layshaft driving gear 13 on needle roller bearings, and this first/third layshaft driving gear 13 is in constant mesh with the power input gear 12, so that again this first/third layshaft driving gear 13 is always being rotated by the power input gear 12 when the internal combustion engine (not shown) is running. Further, on the right hand end in FIG. 6 of the second/fourth layshaft 4 there is rotatably mounted a second/fourth layshaft driving gear 14 on needle roller bearings, and this second/fourth layshaft driving gear 14 is also in constant mesh with the power input gear 12, so that again this second/fourth layshaft driving gear 14 is always being rotated by the power input gear 12 when the internal combustion engine (not shown) is running.

Thus the power input gear 12, the first/third layshaft driving gear 13, and the second/fourth layshaft driving gear 14 are all housed within the hydraulic clutch cover. Further within the upper part of this hydraulic clutch cover in FIG. 6 there is provided a first/third layshaft clutch 15, which selectively according to selective supply of actuating hydraulic fluid pressure thereto rotationally coupled the first/third layshaft driving gear 13 to the first/third layshaft 3. The construction of this first/third layshaft clutch 15, and the various parts thereof, will not be particularly descirbed, because they are substantially the same as in the first and second preferred embodiments, and in any case are not shown in FIG. 6. Functionally, when the first/third layshaft clutch 15 is supplied with actuating hydraulic fluid pressure, said first/third layshaft clutch 15 rotationally couples together the first/third layshaft driving gear 13 and the first/third layshaft 3, so that the first/third layshaft 3 rotates along with the power input shaft 2, the power input gear 12, and the first/third layshaft driving gear 13; but when the first/third layshaft clutch 15 is not supplied with actuating hydraulic fluid pressure, then said first/third layshaft clutch 15 leaves the first/third layshaft driving gear 13 free to rotate by the meshing action of the power input gear 12 without said rotation being transmitted to the first/third layshaft 3.

Similarly, within the lower part of the hydraulic clutch cover in FIG. 6 there is provided a second/fourth layshaft clutch 16, which selectively according to selective supply of actuating hydraulic fluid pressure thereto rotationally couples the second/fourth layshaft driving gear 14 to the second/fourth layshaft 4. The construction of this second/fourth layshaft clutch 16, and the various parts thereof, again will not be particularly described, because they are substantially the same as in the first and second preferred embodiments, and in any case are not shown in FIG. 6. Functionally, when the second/fourth layshaft clutch 16 is supplied with actuating hydraulic fluid pressure, said second/fourth layshaft clutch 16 rotationally couples together the second/fourth layshaft driving gear 14 and the second/fourth layshaft 4, so that the second/fourth layshaft 4 rotates along with the power input shaft 2, the power input gear 12, and the second/fourth layshaft driving gear 14; but when the second/fourth layshaft clutch 16 is not supplied with actuating hydraulic fluid pressure, then said second/fourth layshaft clutch 16 leaves the second/fourth layshaft driving gear 14 free to rotate by the meshing action of the power input gear 12 without said rotation being transmitted to the second/fourth layshaft 4.

Now the arrangements within the gear transmission mechanism casing will be described.

On the first/third layshaft 3 there is fixedly mounted, within the gear transmission mechanism casing at the right hand side in FIG. 6 thereof, a reverse driving gear 125 which is used for providing reverse gear as will be seen hereinafter. Further, on the first/third layshaft 3 to the left in the figure of this reverse driving gear 125 there is fixedly mounted a first speed layshaft fixed gear 123, and on said first/third layshaft 3 to the left in the figure of this first speed layshaft fixed gear 123 there is freely rotatably mounted a third speed layshaft idler gear 124 via needle roller bearings not shown. A thrust bearing, not shown, is provided between the third speed layshaft idler gear 124 and the first/third layshaft 3, for sustaining axial load on the third speed layshaft idler gear 124 and for preventing such axial load causing axial movement of the third speed layshaft idler gear 124 with respect to the first/third layshaft 3. Between the first speed layshaft fixed gear 123 and the third speed layshaft idler gear 124 on the first/third layshaft 3 there is fitted a third speed synchronizer 73, which performs the function of synchronizing engagement of the third speed stage, as will be understood hereinafter.

This third speed synchronizer 73 is of a per se well known sort, in fact being an inertia lock type Borg Warner synchromesh device. However, in contradistinction to the synchronizers used in the first and second preferred embodiments shown and described previously, this third speed synchronizer 73 only selectively synchronizes the revolution speed of one particular gear wheel (the third speed layshaft idler gear 124) with the shaft (the first/third layshaft 3) on which they are both mounted and locks said gear wheel to said shaft, and does not (as did the previously described synchronizers) selectively synchronize the revolution speed of either one of two gear wheels with the shaft on which they are both mounted and lock said one gear wheel to said shaft; in other words, this third speed synchronizer is a one sided type synchronizer, as opposed to the two sided type synchronizers 26 and 36 used in the previously described embodiments. The details of the construction of this one sided third speed synchronizer 73 will not be explained here, because they are per se well known and conventional, because they can be easily conceived of by one of ordinary skill in the art based upon the explanation herein, and because they are not in any case shown in the figure. Suffice it to say that this third speed synchronizer 73 comprises a hub sleeve, and that the function of this third speed synchronizer 73 is either to rotationally couple the third speed layshaft idler gear 124 to the first/third layshaft 3, or not, according as its hub sleeve respectively is shifted to its leftmost position in the figure, or is shifted to its rightmost position therein.

On the second/fourth layshaft 4 there are freely rotatably mounted in order from the right to the left of the figure a second speed layshaft fixed gear 134 and a fourth speed layshaft idler gear 135, via needle roller bearings not shown. Again a thrust bearing, also not shown, is provided between the fourth speed layshaft idler gear 135 and the second/fourth layshaft 4, for sustaining axial load on the fourth speed layshaft idler gear 135 and for preventing such axial load causing axial movement of the fourth speed layshaft idler gear 135 with respect to the second/fourth layshaft 4. Between the second speed layshaft fixed gear 134 and the fourth speed layshaft idler gear 135 on the second/fourth layshaft 4 there is fitted a fourth speed synchronizer 74, which performs the function of synchronizing engagement of the fourth speed stage, as will be understood hereinafter.

This fourth speed synchronizer 74 is of a construction similar to the third speed synchronizer 73 described above, and is again of a per se well known sort, in fact also being an inertia lock type Borg Warner synchromesh device. Again, in contradistinction to the synchronizers used in the first and second preferred embodiments shown and described previously, this fourth speed synchronizer 74 only selectively synchronizes the revolution speed of one particular gear wheel (the fourth speed layshaft idler gear 135) with the shaft (the second/fourth layshaft 4) on which they are both mounted and locks said gear wheel to said shaft; in other words, this fourth speed synchronizer 74 is a one sided type synchronizer like the third speed synchronizer 73, as opposed to the two sided type synchronizers 26 and 36 used in the previously described embodiments. The details of the construction of this one sided fourth speed synchronizer 74 again will not be explained here, because they are per se well known and conventional, because they can be easily conceived of by one of ordinary skill in the art based upon the explanation herein, and because they are not in any case shown in the figure. Suffice it to say that this fourth speed synchronizer 74 again, like the third speed synchronizer 73, comprises a hub sleeve, and that the function of this fourth speed synchronizer 74 is either to rotationally couple the fourth speed layshaft idler gear 135 to the second/fourth layshaft 4, or not, according as its hub sleeve respectively is shifted to its leftmost position in the figure, or is shifted to its rightmost position therein.

On the main shaft 11, which as has been stated previously is rotatably fitted over the power input shaft 2, there are mounted four gear wheels: in order from the left to the right of the figure: a fourth speed mainshaft fixed gear 150 which is fixedly mounted on the main shaft 11 and which is in constant mesh with the fourth speed layshaft idler gear 135; a third speed mainshaft fixed gear 149 which is fixedly mounted on the main shaft 11 and which is in constant mesh with the third speed layshaft idler gear 124; a second speed mainshaft idler gear 148 which is rotatably mounted on the main shaft 11 and which is in constant mesh with the second speed layshaft fixed gear 134; and a first speed mainshaft idler gear 147 which is rotatably mounted on the main shaft 11 and which is in constant mesh with the first speed layshaft fixed gear 123. The fourth speed mainshaft fixed gear 150 and the third speed mainshaft fixed gear 149 are splined to the main shaft 11 so as to rotatably fix them thereto, although this is not particularly shown in the figure.

On the main shaft 11 there is fitted a first speed synchronizer 71, which performs the function of synchronizing engagement of the first speed stage, as will be understood hereinafter.

This first speed synchronizer 71 is of a construction similar to the third and fourth speed synchronizers 73 and 74 described above, and is again of a per se well known sort, in fact also being an inertia lock type Borg Warner synchromesh device. Again, in contradistinction to the synchronizers used in the first and second preferred embodiments shown and described previously, this first speed synchronizer 71 only selectively synchronizes the revolution speed of one particular gear wheel (the first speed mainshaft idler gear 147) with the shaft (the main shaft 11) on which they are both mounted and locks said gear wheel to said shaft; in other words, this first speed synchronizer 71 is a one sided type synchronizer like the third speed synchronizer 73 and the fourth speed synchronizer 74, as opposed to the two sided type synchronizers 26 and 36 used in the previously described embodiments. The details of the construction of this one sided first speed synchronizer 71 again will not be explained here, because they are per se well known and conventional, because they can be easily conceived of by one of ordinary skill in the art based upon the explanation herein, and because they are not in any case shown in the figure. Suffice it to say that this first speed synchronizer 71 again, like the third speed synchronizer 73 and the fourth speed synchronizer 74, comprises a hub sleeve, and that the function of this first speed synchronizer 71 is either to rotationally couple the first speed mainshaft idler gear 147 to the main shaft 11, or not, according as its hub sleeve respectively is shifted to its leftmost position in the figure, or is shifted to its rightmost position therein.

On the outside of the hub sleeve of the first speed synchronizer 71 there is formed a reverse driven gear 164, for use during the operation of the gear transmission mechanism in the reverse speed stage, as will be explained hereinafter.

Further, on the main shaft 11 there is also fitted a second speed synchronizer 72, which performs the function of synchronizing engagement of the second speed stage, as will be understood hereinafter.

This second speed synchronizer 72 is of a construction similar to the first, third, and fourth speed synchronizers 71, 73, and 74 described above, and is again of a per se well known sort, in fact also being an inertia lock type Borg Warner synchromesh device. Again, in contradistinction to the synchronizers used in the first and second preferred embodiments shown and described previously, this second speed synchronizer 72 only selectively synchronizes the revolution speed of one particular gear wheel (the second speed mainshaft idler gear 148) with the shaft (the main shaft 11) on which they are both mounted and locks said gear wheel to said shaft; in other words, this second speed synchronizer 72 is a one sided type synchronizer like the first speed synchronizer 71, the third speed synchronizer 73, and the fourth speed synchronizer 74, as opposed to the two sided type synchronizers 26 and 36 used in the previously described embodiments. The details of the construction of this one sided second speed synchronizer 72 again will not be explained here, because they are per se well known and conventional, because they can be easily conceived of by one of ordinary skill in the art based upon the explanation herein, and because they are not in any case shown in the figure. Suffice it to say that this second speed synchronizer 72 again, like the first speed synchronizer 71, the third speed synchronizer 73, and the fourth speed synchronizer 74, comprises a hub sleeve, and that the function of this second speed synchronizer 72 is either to rotationally couple the second speed mainshaft idler gear 148 to the main shaft 11, or not, according as its hub sleeve respectively is shifted to its leftmost position in the figure, or is shifted to its rightmost position therein.

On the first/third layshaft 3 there is also provided as freely rotatable a power output gear 151, which in this third preferred embodiment of the gear transmission mechanism with multiple layshafts according to the present invention is constructed integrally with the third speed layshaft idler gear 124 on its left hand side in the figure. This power output gear 151 in constant mesh with the differential power input ring gear 153 of the differential gear mechanism, which as mentioned before is of a per se well known sort and is not particularly shown in the figure.

Finally, within the gear transmission mechanism casing on a reverse idler gear shaft 162 which is supported within the gear transmission mechanism casing as parallel to the power input shaft 2 and the first/third layshaft 3 and the second/fourth layshaft 4 there is rotatably and slidably mounted a reverse idler gear 163. This reverse idler gear 163 and this reverse idler gear shaft 162 are, again, only shown in FIG. 6 by dotted lines, because in the view of FIG. 6 they lie partly behind various other parts therein. Arrangements of a per se well known sort, not shown in the figure, are provided for shifting this reverse idler gear 163 to and fro in the left and right directions in FIG. 6 on the reverse idler gear shaft 162; and, when the reverse idler gear 163 is in its most rightwards position in FIG. 6 on the reverse idler gear shaft 162, said reverse idler gear 163 does not mesh with any other gear wheels and is therefore free to rotate; but, when the reverse idler gear 163 is in its most leftwards position in FIG. 6 on the reverse idler gear shaft 162, said reverse idler gear 163 meshes with the reverse driving gear 125 and with the reverse driven gear 164 which is provided on the first speed synchronizer 71 as mentioned above, so as to provide a reverse speed stage, as will be explained later.

Now the operation of the gear transmission mechanism shown in FIG. 6, which is the third preferred embodiment of the gear transmission mechanism with multiple layshafts according to the present invention, will be explained. In this connection, it should be understood that selective supply or non supply of actuating hydraulic fluid pressure to the first/third layshaft clutch 15 and to the second/fourth layshaft clutch 16, via appropriate hydraulic passages not of course shown in the figure but corresponding to the first hydraulic passage 45a and the second hydraulic passage 45b in the first and second preferred embodiments, is suitably performed according to operational parameters of the vehicle of which this gear transmission mechanism forms part from a control system for the automatic transmission of which the shown gear transmission mechanism according to the third preferred embodiment of the present invention forms part; and this control system will not be described herein with regard to its construction, because said control system does not directly form part of the present invention, and the functional explanation of its operation which will be given herein is sufficient for understanding of the principles of operation of the gear transmission mechanism with multiple layshafts according to the present invention. The movement leftwards and rightwards in FIG. 6 of the hub sleeve of the first speed synchronizer 71, of the hub sleeve of the second speed synchronizer 72, the hub sleeve of the third speed synchronizer 73, of the hub sleeve of the fourth speed synchronizer 74, and of the reverse idler gear 163 on the reverse idler gear shaft 162, is also suitably selectively performed (using appropriate forks or the like of a per se well known sort) by this control system, according to operational parameters of the vehicle of which this gear transmission mechanism forms part, and this operation of said control system will also be functionally explained hereinafter, but will not be constructionally explained.

First the positions and engagement conditions of each of the first speed synchronizer 71, the second speed synchronizer 72, the third speed synchronizer 73, the fourth speed synchronizer 74, the first/third layshaft clutch 15, and the second/fourth layshaft clutch 16 will be explained, during the engagement of each of the speed stages which can be provided by the gear transmission mechanism according to the third preferred embodiment of the present invention explained above, i.e. during the engagement of the neutral speed stage, the first forward speed stage, the second forward speed stage, the third forward speed stage, the fourth forward speed stage, and the reverse speed stage; and then the sequences of shifting and of engagement and disengagement operations of these means which are employed in the various possible operations of shifting between these speed stages will be explained.

In the neutral speed stage, the hub sleeve of the first speed synchronizer 71 is set to its rightwardly displaced position by the above mentioned transmission control system, the hub sleeve of the second speed synchronizer 72 is also set to its rightwardly displaced position by said control system, the hub sleeve of the third speed synchronizer 73 is also set to its rightwardly displaced position by the above mentioned transmission control system, the hub sleeve of the fourth speed synchronizer 74 is also set to its rightwardly displaced position by said control system, and neither one of the first/third layshaft clutch 15 and the second/fourth layshaft clutch 16 is supplied with actuating hydraulic fluid pressure by said control system, so that neither the first/third layshaft clutch 15 nor the second/fourth layshaft clutch 16 is engaged, but both of them are free to slip. In this operational condition, the rotation of the power input shaft 2 which as explained above is always rotationally driven by the crankshaft of the internal combustion engine (not shown) via the fluid torque converter 100 is not positively transmitted to the first/third layshaft 3 or to the second/fourth layshaft 4, since the first/third layshaft clutch 15 and also the second/fourth layshaft clutch 16 are disengaged; and, even if some of this rotation is transmitted to the first/third layshaft 3 or the second/fourth layshaft 4, since the first speed synchronizer 71, the second speed synchronizer 72, the third speed synchronizer 73, and the fourth speed synchronizer 74 are all disengaged, therefore no substantial rotational force is transmitted to the power output gear 151, and hence no substantial rotational force is supplied to the differential gear mechanism. Thus the gear transmission mechanism according to the third preferred embodiment of the present invention functions in its neutral speed stage.

In the first speed stage, the hub sleeve of the first speed synchronizer 71 is set to its leftwardly displaced position by the above mentioned transmission control system, the hub sleeve of the second speed synchronizer 72 is set to its rightwardly displaced position by said control system, the hub sleeve of the third synchronizer 73 is also set to its rightwardly displaced position by the above mentioned transmission control system, the hub sleeve of the fourth speed synchronizer 74 is also set to its rightwardly displaced position by said control system, and the first/third layshaft clutch 15 is supplied with actuating hydraulic fluid pressure by said control system, while the second/fourth layshaft clutch 16 is not supplied with actuating hydraulic fluid pressure by said control system; so that said first/third layshaft clutch 15 is engaged according to supply of hydraulic fluid pressure to its pressure chamber, but said second/fourth layshaft clutch 16 is not engaged. In this operational condition, the rotation of the power input shaft 2 which as explained above is always rotationally driven by the crankshaft of the internal combustion engine (not shown) via the fluid torque converter (also not shown) is not positively transmitted to the second/fourth layshaft 4, since the second/fourth layshaft clutch 16 is disengaged; and, even if some of this rotation is transmitted to the second/fourth layshaft 4, since the second speed synchronizer 72 and the fourth speed synchronizer 74 are disengaged, therefore no substantial rotational force is transmitted thence to the power output gear 151. However, the rotation of the power input shaft 2 is transmitted through the power input gear 12, through the first/third layshaft driving gear 13, through the first/third layshaft clutch 15 which as explained above is engaged, to the first/third layshaft 3, and thence is transmitted to the first speed layshaft fixed gear 123 which transmits said rotation to the first speed mainshaft idler gear 147, which via the first speed synchronizer 71 now engaged therewith transmits said rotation to the main shaft 11, thus rotating the main shaft 11 and the two fixed gear wheels mounted thereon (i.e. the fourth speed mainshaft fixed gear 150 and the third speed mainshaft fixed gear 149). Thus in particular the third speed mainshaft fixed gear 149 is rotated by the main shaft 11 on which it is fixedly mounted, and this third speed mainshaft fixed gear 149 rotates the third speed layshaft idler gear 124 which in this third preferred embodiment is integral with the power output gear 151, thus transmitting output rotational power to the differential gear mechanism (not shown). Thus the gear transmission mechanism according to the third preferred embodiment of the present invention functions in its first speed stage.

In the second speed stage, the hub sleeve of the first speed synchronizer 71 is set to its rightwardly displaced position by the above mentioned transmission control system, the hub sleeve of the second speed synchronizer 72 is set to its leftwardly displaced position by said control system, the hub sleeve of the third speed synchronizer 73 is set to its rightwardly disposed position by the above mentioned transmission control system, the hub sleeve of the fourth speed synchronizer 74 is also set to its rightwardly displaced position by said control system, and the first/third layshaft clutch 15 is not supplied with actuating hydraulic fluid pressure by said control system, while the second/fourth layshaft clutch 16 is supplied with actuating hydraulic fluid pressure by said control system; so that said first/third layshaft clutch 15 is not engaged, but said second/fourth layshaft clutch 16 is engaged according to supply of hydraulic fluid pressure to its pressure chamber. In this operational condition, the rotation of the power input shaft 2 which as explained above is always rotationally driven by the crankshaft of the internal combustion engine (not shown) via the fluid torque converter is not positively transmitted to the first/third layshaft 3, since the first/third layshaft clutch 15 is disengaged; and, even if some of this rotation is transmitted to the first/third layshaft 3, since the first speed synchronizer 71 and the third speed synchronizer 73 are disengaged, therefore no substantial rotational force is transmitted thence to any gear wheel or to the power output gear 151. However, the rotation of the power input shaft 2 is transmitted through the power input gear 12, through the second/fourth layshaft driving gear 14, through the second/fourth layshaft clutch 16 which as explained above is engaged, to the second/fourth layshaft 4, and thence is transmitted to the second speed layshaft fixed gear 134 which transmits said rotation to the second speed mainshaft idler gear 148, which via the second speed synchronizer 72 now engaged therewith rotates the main shaft 11 and the two fixed gear wheels mounted thereon (i.e. the fourth speed mainshaft fixed gear 150 and the third speed mainshaft fixed gear 149). Thus in particular again the third speed mainshaft fixed gear 149 is rotated by the main shaft 11 on which it is fixedly mounted, and this third speed mainshaft fixed gear 149 rotates the third speed layshaft idler gear 124 which in this third preferred embodiment is integral with the power output gear 151, thus transmitting output rotational power to the differential gear mechanism (not shown). Thus the gear transmission mechanism according to the third preferred embodiment of the present invention functions in its second speed stage.

In the third speed stage, the hub sleeve of the first speed synchronizer 71 is set to its rightwardly displaced position by the above mentioned transmission control system, the hub sleeve of the second speed synchronizer 72 is also set to its rightwardly displaced position by said control system, the hub sleeve of the third speed synchronizer 73 is set to its leftwardly displaced position by the above mentioned transmission control system, the hub sleeve of the fourth speed synchronizer 74 is set to its rightwardly displaced position by said control system, and the first/third layshaft clutch 15 is supplied with actuating hydraulic fluid pressure by said control system, while the second/fourth layshaft clutch 16 is not supplied with actuating hydraulic fluid pressure by said control system; so that said first/third layshaft clutch 15 is engaged according to supply of hydraulic fluid pressure to its pressure chamber, but said second/fourth layshaft clutch is not engaged. In this operational condition, the rotation of the power input shaft 2 which as explained above is always rotationally driven by the crankshaft of the internal combustion engine (not shown) via the fluid torque converter (also not shown) is not positively transmitted to the second/fourth layshaft 4, since the second/fourth layshaft clutch 16 is disengaged; and, even if some of this rotation is transmitted to the second/fourth layshaft 4, since the second speed synchronizer 72 and the fourth speed synchronizer 74 are disengaged, therefore no substantial rotational force is transmitted thence to any gear wheel mounted thereon or to the power output gear 151. However, the rotation of the power input shaft 2 is transmitted through the power input gear 12, through the first/third layshaft driving gear 13, through the first/third layshaft clutch 15 which as explained above is engaged, to the first/third layshaft 3, and thence is directly transmitted via the third speed synchronizer 73 to the third speed layshaft idler gear 124 now engaged therewith; and since in this third preferred embodiment this third speed layshaft idler gear 124 is integral with the power output gear 151, thus output rotational power is directly transmitted to the differential gear mechanism, without the intervention of any gear wheels (except the power input gear 12 and the first/third layshaft driving gear 13). Thus the gear transmission mechanism according to the third preferred embodiment of the present invention functions in its third speed stage, which is a directly connected speed stage.

In the fourth speed stage, the hub sleeve of the first speed synchronizer 71 is set to its rightwardly displaced position by the above mentioned transmission control system, the hub sleeve of the second speed synchronizer 72 is also set to its rightwardly displaced position by said control system, the hub sleeve of the third speed synchronizer 73 is also set to its rightwardly displaced position by the above mentioned transmission control system, the hub sleeve of the fourth speed synchronizer 74 is set to its leftwardly displaced position by said control system, and the first/third layshaft clutch 15 is not supplied with actuating hydraulic fluid pressure by said control system, while the second/fourth layshaft clutch 16 is supplied with actuating hydraulic fluid pressure by said control system; so that said first/third layshaft clutch 15 is not engaged, but said second/fourth layshaft clutch 16 is engaged according to supply of hydraulic fluid pressure to its pressure chamber. In this operational condition, the rotation of the power input shaft 2 which as explained above is always rotationally driven by the crankshaft of the internal combustion engine (not shown) via the fluid torque converter is not positively transmitted to the first/third layshaft 3, since the first/third layshaft clutch 15 is disengaged; and, even if some of this rotation is transmitted to the first/third layshaft 3, since the first speed synchronizer 71 and the third speed synchronizer 73 are disengaged, therefore no substantial rotational force is transmitted thence to any gear wheel or to the power output gear 151. However, the rotation of the power input shaft 2 is transmitted through the power input gear 12, through the second/fourth layshaft driving gear 14, through the second/fourth layshaft clutch 16 which as explained above is engaged, to the second/fourth layshaft 4, and thence is transmitted via the fourth speed synchronizer 74 to the fourth speed layshaft idler gear 135 now engaged therewith. This fourth speed layshaft idler gear 135 transmits this rotational power to the fourth speed mainshaft fixed gear 150 with which it is in constant mesh, and this fourth speed mainshaft fixed gear 150 rotationally drives the mainshaft 11 and the third speed mainshaft fixed gear 149. The third speed mainshaft fixed gear 149 rotationally drives the third speed layshaft idler gear 124, which in this third preferred embodiment is integral with the power output gear 151. Thus engine output rotational power is transmitted to the differential gear mechanism. Thus the gear transmission mechanism according to the third preferred embodiment of the present invention functions in its fourth speed stage.

In the reverse speed stage, the hub sleeve of the first speed synchronizer 71 is set to its rightwardly displaced position by the above mentioned transmission control system, the hub sleeve of the second speed synchronizer 72 is also set to its rightwardly displaced position by said control system, the hub sleeve of the third speed synchronizer 73 is also set to its rightwardly displaced position by the above mentioned transmission control system, the hub sleeve of the fourth speed synchronizer 74 is also set to its rightwardly displaced position by said control system, and the first/third layshaft clutch 15 is supplied with actuating hydraulic fluid pressure by said control system, while the second/fourth layshaft clutch 16 is not supplied with actuating hydraulic fluid pressure by said control system; so that said first/third layshaft clutch 15 is engaged according to supply of hydraulic fluid pressure to its pressure chamber, but said second/fourth layshaft clutch 16 is not engaged. In this operational condition, the rotation of the power input shaft 2 which as explained above is always rotationally driven by the crankshaft of the internal combustion engine (not shown) via the fluid torque converter is not positively transmitted to the second/fourth layshaft 4, since the second/fourth layshaft clutch 16 is disengaged; and, even if some of this rotation is transmitted to the second/fourth layshaft 4, since the second speed synchronizer 72 and the fourth speed synchronizer 74 are disengaged, therefore no substantial rotational force is transmitted thence to any gear wheel mounted thereon or to the power output gear 151. Further, in this reverse speed stage, the reverse idler gear 163 is shifted in the leftwards direction in FIG. 6 along the reverse idler gear shaft 162 by the abovementioned control system via a fork or the like of a per se well known sort, so that said reverse idler gear 163 engages both with the reverse driving gear 125 fixed on the first/third layshaft 3 and with the reverse driven gear 164 formed on the outside of the hub sleeve of the first speed synchronizer 71. Thus, the rotation of the power input shaft 2 is transmitted through the power input gear 12, through the first/third layshaft driving gear 13, through the first/third layshaft clutch 15 which as explained above is engaged, to the first/third layshaft 3, and thence is transmitted via the reverse driving gear 125 and the reverse idler gear 163 to the reverse driven gear 164 formed on the outside of the hub sleeve of the first speed synchronizer 71, which transmits said rotation to the main shaft 11, thus rotating this main shaft 11 and the two fixed gear wheels mounted thereon (i.e. the fourth speed mainshaft fixed gear 150 and the third speed mainshaft fixed gear 149), in the reverse rotational sense to that in which said main shaft 11 is rotated in all the other gear stages whose operation is explained above (since one more gear wheel, the reverse idler gear 163, is involved in the rotational force transmission path). Thus in particular the third speed mainshaft fixed gear 149 is reversedly rotated by the main shaft 11 on which it is fixedly mounted, and this third speed mainshaft fixed gear 149 rotates the third speed layshaft idler gear 124 which in this third preferred embodiment is integral with the power output gear 151, thus transmitting output rotational power in a reverse sense to the case of the other speed stages mentioned above to the differential gear mechanism. Thus the gear transmission mechanism according to the third preferred embodiment of the present invention functions in its reverse speed stage.

Now the sequences of shifting and of engagement and disengagement operations of these means, i.e. of the first speed synchronizer 71, the second speed synchronizer 72, the third speed synchronizer 73, the fourth speed synchronizer 74, the first/third layshaft clutch 15, the second/fourth layshaft clutch 16, and the reverse idler gear 163, which are employed in the various possible operations of shifting between these speed stages will be explained.

First, in the case of upshifting from the neutral speed stage to the first speed stage, first the gear transmission mechanism according to the third preferred embodiment of the present invention is in the condition described above with respect to the engagement of the neutral speed stage. From this condition, first as a preparatory action the hub sleeve of the first speed synchronizer 71 is shifted by the control system from its central or intermediate position to its rightward position, so as to rotationally connect the main shaft 11 and the first speed mainshaft idler gear 147, while still keeping both the first/third layshaft clutch 15 and the second/fourth layshaft clutch 16 in their states of not being supplied with actuating hydraulic fluid pressure and not being engaged. It should be noted that this shifting of the hub sleeve of the first speed synchronizer 71 can be performed smoothly at this time, because as explained above the main shaft 11 and the first speed mainshaft idler gear 147 are not substantially rotating at this time because the first/third layshaft clutch 15 and the second/fourth layshaft clutch 16 are disengaged, or even if these members are rotating somewhat due to dragging of the first/third layshaft clutch 15 and/or the second/fourth layshaft clutch 16 this rotation is not substantially powered and can be easily overcome by the per se well known synchronizing action of the first speed synchronizer 71. After this preparatory action of engaging the first speed synchronizer 71 and the main shaft 11 to the first speed mainshaft idler gear 147 has been accomplished satisfactorily, then the actual engagement of the first speed stage from the neutral speed stage, i.e. the actual change of speed stage, is smoothly and progressively accomplished by the above mentioned control system engaging the first/third layshaft clutch 15 in a smooth and controlled manner by progressive supply of hydraulic fluid pressure to the pressure chamber of said first/third layshaft clutch 15. However, the control system keeps the second/fourth layshaft clutch 16 disengaged by not supplying any actuating hydraulic fluid pressure to its pressure chamber. Thus the transition to the above described positions and engagement conditions of the various parts for providing the first speed stage is made.

It will be understood that, mutatis mutandis, this process will be suitable for the shifting from the neutral speed stage to any forward speed stage (in particular, to the second forward speed stage, in which second speed stage often, depending upon operational conditions of the vehicle incorporating the shown gear transmission mechanism, it may be desired to start the vehicle from rest): in general, first as a preparatory action the control system shifts the appropriate one of the first speed synchronizer 71, the second speed synchronizer 72, the third speed synchronizer 73, and the fourth speed synchronizer 74 to engage the appropriate one of the first speed mainshaft idler gear 147, the second speed mainshaft idler gear 148, the third speed layshaft idler gear 124, and the fourth speed layshaft idler gear 135 for the desired speed stage with the appropriate one of the main shaft 11, the first/third layshaft 3, and the second/fourth layshaft 4 which passes therethrough, and subsequently in order actually to engage said desired speed stage the first/third layshaft clutch 15 or the second/fourth layshaft clutch 16 is smoothly and progressively engaged by said control system by supply of actuating hydraulic fluid pressure thereto, while, correspondingly, the second/fourth layshaft clutch 16 or the first/third layshaft clutch 15 is kept disengaged.

Next, in the case of upshifting from the first speed stage to the second speed stage, first the gear transmission mechanism according to the third preferred embodiment of the present invention is in the condition described above with respect to the engagement of the first speed stage. From this condition, first as a preparatory action the hub sleeve of the second speed synchronizer 72 is shifted by the control system from its rightward position to its leftward position, so as to rotationally connect the main shaft 11 and the second speed mainshaft idler gear 148, while still keeping the first/third layshaft clutch 15 in its state of being supplied with actuating hydraulic fluid pressure so as to keep it engaged, and keeping the second/fourth layshaft clutch 16 in its statge of not being supplied with actuating hydraulic fluid pressure and not being engaged. It should be noted that this shifting of the hub sleeve of the second speed synchronizer 72 can be performed smoothly at this time, because as explained above the second speed mainshaft idler gear 148 which is meshed constantly with the second speed layshaft fixed gear 134 fixed to the second/fourth layshaft 4 is substantially free to rotate at this time because the second/fourth layshaft clutch 16 is disengaged, or even if these members are rotating somewhat due to dragging of the second/fourth layshaft clutch 16 this rotation is not substantially powered and can be easily overcome by the per se well known synchronizing action of the second speed synchronizer 72, so as to match the rotational speeds of the main shaft 11 and the second speed mainshaft idler gear 148. After this preparatory action of engaging the second speed synchronizer 72 and the main shaft 11 to the second speed mainshaft idler gear 148 has been accomplished satisfactorily, then the actual engagement of the second speed stage from the first speed stage, i.e. the actual change of speed stage, is smoothly and progressively accomplished by the above mentioned control system disengaging the first/third layshaft clutch 15 fairly sharply, and simultaneously at an appropriate timing (appropriate to an upshifting action) engaging the second/fourth layshaft clutch 16 in a smooth and controlled manner by progressive supply of hydraulic fluid pressure to the pressure chamber of said second/fourth layshaft clutch 16. This changeover of the engagement and disengagement conditions of the first/third layshaft clutch 15 and the second/fourth layshaft clutch 16 is made in an analogous manner to the change of speed stage in a conventional automatic transmission incorporating a conventional type of gear transmission mechanism which comprises a plurality of hydraulic fluid pressure actuated friction engaging mechanisms such as hydraulically actuated clutches and hydraulically actuated brakes; in such a conventional automatic transmission, it is common practice when shifting speed stages to disengage the relevant hydraulic fluid pressure actuated friction engaging mechanisms which should be disengaged from the engaged condition fairly sharply by fairly sharp cessation of the supply of hydraulic fluid pressure thereto, but to engage the relevant hydraulic fluid pressure actuated friction engaging mechanisms which should be engaged from the disengaged condition rather smoothly and progressively by smooth and progressive commencement of the supply of hydraulic pressure thereto. This procedure, as is per se well known, softens the shift shock, and ensures good durability of the parts of the transmission, especially the friction engaging mechanisms, by preventing the engine racing during speed shifting, as well as preventing torque shock or jerk being transmitted along the power train of the vehicle, which could deteriorate the mechanisms of the transmission, as well as providing a poor driving feeling to the vehicle and impairing its drivability. Finally, after the disengagement of the first/third layshaft clutch 15 and the engagement of the second-/fourth layshaft clutch 16 have been quite completed, at a later stage as a concluding action the hub sleeve of the first speed synchronizer 71 is shifted by the control system from its leftward position to its rightward position, so as to rotationally disconnect the main shaft 11 and the first speed mainshaft idler gear 147. Thus the transition to the above described positions and engagement conditions of the various parts for providing the second speed stage is made.

Next, in the case of upshifting from the second speed stage to the third speed stage, first the gear transmission mechanism according to the third preferred embodiment of the present invention is in the condition described above with respect to the engagement of the second speed stage. From this condition, first as a preparatory action the hub sleeve of the third speed synchronizer 73 is shifted by the control system from its rightward position to its leftward position, so as to rotationally connect the first/third layshaft 3 and the third speed layshaft idler gear 124, while still keeping the second/fourth layshaft clutch 16 in its state of being supplied with actuating hydraulic fluid pressure so as to keep it engaged, and keeping the first/third layshaft clutch 15 in its state of not being supplied with actuating hydraulic fluid pressure and not being engaged. It should be noted that this shifting of the hub sleeve of the third speed synchronizer 73 can be performed smoothly at this time, because as explained above the first/third layshaft 3 is substantially free to rotate at this time because the first/third layshaft clutch 15 is disengaged, or even if the first/third layshaft 3 is rotating somewhat due to dragging of the first/third layshaft clutch 15 this rotation is not substantially powered and can be easily overcome by the per se well known synchronizing action of the third speed synchronizer 73, so as to match the rotational speeds of the first/third layshaft 3 and the third speed layshaft idler gear 124. After this preparatory action of engaging the third speed synchronizer 73 and the first/third layshaft 3 to the third speed layshaft idler gear 124 has been accomplished satisfactorily, then the actual engagement of the third speed stage from the second speed stage, i.e. the actual change of speed stage, is smoothly and progressively accomplished by the above mentioned control system disengaging the second/fourth layshaft clutch 16 fairly sharply, and simultaneously at an appropriate timing (appropriate for an upshifting action) engaging the first/third layshaft clutch 15 in a smooth and controlled manner by progressive supply of hydraulic fluid pressure to the pressure chamber of said first/third layshaft clutch 15. This changeover of the engagement and disengagement conditions of the first/third layshaft clutch 15 and the second/fourth layshaft clutch 16 is again made in an analogous manner to the change of speed stage in a conventional automatic transmission incorporating a conventional type of gear transmission mechanism which comprises a plurality of hydraulic fluid pressure actuated friction engaging mechanisms such as hydraulically actuated clutches and hydraulically actuated brakes. Finally, after the disengagement of the second/fourth layshaft clutch 16 and the engagement of the first/third layshaft clutch 15 have been quite completed, at a later stage as a concluding action the hub sleeve of the second speed synchronizer 72 is shifted by the control system from its rightward position to its leftward position, so as to rotationally disconnect the main shaft 11 and the second speed mainshaft idler gear 148. Thus the transition to the above described positions and engagement conditions of the various parts for providing the third speed stage is made.

Next, in the case of upshifting from the third speed stage to the fourth speed stage, first the gear transmission mechanism according to the third preferred embodiment of the present invention is in the condition described above with respect to the engagement of the third speed stage. From this condition, first as a preparatory action the hub sleeve of the fourth speed synchronizer 74 is shifted by the control system from its rightward position to its leftward position, so as to rotationally connect the second/fourth layshaft 4 and the fourth speed layshaft idler gear 135, while still keeping the first/third layshaft clutch 15 in its state of being supplied with actuating hydraulic fluid pressure so as to keep it engaged, and keeping the second/fourth layshaft clutch 16 in its state of not being supplied with actuating hydraulic fluid pressure and not being engaged. It should be noted that this shifting of the hub sleeve of the fourth speed synchronizer 74 can be performed smoothly at this time, because as explained above the second/fourth layshaft 4 is substantially free to rotate at this time because the second/fourth layshaft clutch 16 is disengaged, or even if the second/fourth layshaft 4 is rotating somewaht due to dragging of the second-/fourth layshaft clutch 16 this rotation is not substantially powered and can be easily overcome by the per se well known synchronizing action of the fourth speed synchronizer 74, so as to match the rotational speeds of the second/fourth layshaft 4 and the fourth speed layshaft idler gear 135. After this preparatory action of engaging the fourth speed synchronizer 74 and the second/fourth layshaft 4 to the fourth speed layshaft idler gear 135 has been accomplished satisfactorily, then the actual engagement of the fourth speed stage from the third speed stage, i.e. the actual change of speed stage, is smoothly and progressively accomplished by the above mentioned control system disengaging the first/-third layshaft clutch 15 fairly sharply, and simultaneously at an appropriate timing (again appropriate for an upshifting action) engaging the second/fourth layshaft clutch 16 in a smooth and controlled manner by progressive supply of hydraulic fluid pressure to the pressure chamber of said second/fourth layshaft clutch 16. This changeover of the engagement and disengagement conditions of the first/third layshaft clutch 15 and the second/fourth layshaft clutch 16 is again made in an analogous manner to the change of speed stage in a conventional automatic transmission incorporating a conventional type of gear transmission mechanism which comprises a plurality of hydraulic fluid pressure actuated friction engaging mechanisms such as hydraulically actuated clutches and hydraulically actuated brakes. Finally, after the disengagement of the first/third layshaft clutch 15 and the engagement of the second/fourth layshaft clutch 16 have been quite completed, at a later stage as a concluding action the hub sleeve of the third speed synchronizer 73 is shifted by the control system from its leftward position to its rightward position, so as to rotationally disconnect the first/third layshaft 3 and the third speed layshaft idler gear 124. Thus the transition to the above described positions and engagement conditions of the various parts for providing the fourth speed stage is made.

Next, in the case of downshifting from the fourth speed stage to the third speed stage, first the gear transmission mechanism according to the third preferred embodiment of the present invention is in the condition described above with respect to the engagement of the fourth speed stage. From this condition, first as a preparatory action the hub sleeve of the third speed synchronizer 73 is shifted by the control system from its rightward position to its leftward position, so as to rotationally connect the first/third layshaft 3 and the third speed layshaft idler gear 124, while still keeping the second/fourth layshaft clutch 16 in its state of being supplied with actuating hydraulic fluid pressure so as to keep it engaged, and keeping the first/third layshaft clutch 15 in its state of not being supplied with actuating hydraulic fluid pressure and not being engaged. It should be noted that this shifting of the hub sleeve of the third speed synchronizer 73 can be performed smoothly at this time, because as explained above the first/third layshaft 3 is substantially free to rotate at this time because the first/third layshaft clutch 15 is disengaged, or even if the first/third layshaft 3 is rotating somewhat due to dragging of the first/third layshaft cluth 15 this rotation is not substantially powered and can be easily overcome by the per se well known synchronizing action of the third speed synchronizer 73, so as to match the rotational speeds of the first/third layshaft 3 and the third speed layshaft idler geare 124. After this preparatory action of engaging the third speed synchronizer 73 and the first/third layshaft 3 to the third speed layshaft idler gear 124 has been accomplished satisfactorily, then the actual engagement of the third speed stage from the fourth speed stage, i.e. the actual change of speed stage, is smoothly and progressively accomplished by the above mentioned control system disengaging the second/fourth layshaft clutch 16 fairly sharply, and simultaneously at an appropriate timing engaging the first/third layshaft clutch 15 in a smooth and controlled manner (appropriate, this time, to a downshifting action) by progressive supply of hydraulic fluid pressure to the pressure chamber of said first/third layshaft clutch 15. This changeover of the engagement and disengagement conditions of the first/third layshaft clutch 15 and the second/fourth layshaft clutch 16 is again made in an analogous manner to the change of speed stage in a conventional automatic transmission incorporating a conventional type of gear transmission mechanism which comprises a plurality of hydraulic fluid pressure actuated friction engaging mechanisms such as hydraulically actuated clutches and hydraulically actuated brakes. Finally, after the disengagement of the second/fourth layshaft clutch 16 and the engagement of the first/third layshaft clutch 15 have been quite completed, at a later stage as a concluding action the hub sleeve of the fourth speed synchronizer 74 is shifted by the control system from its leftward position to its rightward position, so as to rotationally disconnect the second/fourth layshaft 4 and the fourth speed layshaft idler gear 135. Thus the transition to the above described positions and engagement conditions of the various parts for providing the third speed stage is made.

Next, in the case of downshifting from the third speed stage to the second speed stage, first the gear transmission mechanism according to the third preferred embodiment of the present invention is in the condition described above with respect to the engagement of the third speed stage. From this condition, first as a preparatory action the hub sleeve of the second speed synchronizer 72 is shifted by the control system from its rightward position to its leftward position, so as to rotationally connect the main shaft 11 and the second speed mainshaft idler gear 148, while still keeping the first/third layshaft clutch 15 in its state of being supplied with actuating hydraulic fluid pressure so as to keep it engaged, and keeping the second/fourth layshaft clutch 16 in its state of not being supplied with actuating hydraulic fluid pressure and not being engaged. It should be noted that this shifting of the hub sleeve of the second speed synchronizer 72 can be performed smoothly at this time, because as explained above the second speed mainshaft idler gear 148, which is always meshed with the second speed layshaft fixed gear 134 on the second/fourth layshaft 4, is substantially free to rotate at this time because the second/fourth layshaft clutch 16 is disengaged, or even if these members are rotating somewhat due to dragging of the second/fourth layshaft clutch 16 this rotation is not substantially powered and can be easily overcome by the per se well known synchronizing action of the second speed synchronizer 72, so as to match the rotational speeds of the main shaft 11 and the second speed mainshaft idler gear 148. After this preparatory actin of engaging the second speed synchronizer 72 and the main shaft 11 to the second speed mainshaft idler gear 148 has been accomplished satisfactorily, then the actual engagement of the second speed stage from the third speed stage, i.e. the actual change of speed stage, is smoothly and progressively accomplished by the above mentioned control system disengaging the first/third layshaft clutch 15 fairly sharply, and simultaneously at an appropriate timing (appropriate to a downshifting action) engaging the second/fourth layshaft clutch 16 in a smooth and controlled manner by progressive supply of hydraulic fluid pressure to the pressure chamber of said second/fourth layshaft clutch 16. This changeover of the engagement and disengagement conditions of the first/third layshaft clutch 15 and the second/fourth layshaft clutch 16 is made in an analogous manner to the change of speed stage in a conventional automatic transmission incorporating a conventional type of gear transmission mechanism which comprises a plurality of hydraulic fluid pressure actuated friction engaging mechanisms such as hydraulically actuated clutches and hydraulically actuated brakes. Finally, after the disengagement of the first/third layshaft clutch 15 and the engagement of the second/fourth layshaft clutch 16 have been quite completed, at a later stage as a concluding action the hub sleeve of the third speed synchronizer 73 is shifted by the control system from its leftward position to its rightward position, so as to rotationally disconnect the first/third layshaft 3 and the third speed layshaft idler gear 124. Thus the transition to the above described positions and engagement conditions of the various parts for providing the second speed stage is made.

Next, in the case of downshifting from the second speed stage to the first speed stage, first the gear transmission mechanism according to the third preferred embodiment of the present invention is in the condition described above with respect to the engagement of the second speed stage. From this condition, first as a preparatory action the hub sleeve of the first speed synchronizer 71 is shifted by the control system from its rightward position to its leftward position, so as to rotationally connect the main shaft 11 and the first speed mainshaft idler gear 147, while still keeping the second/fourth layshaft clutch 16 in its state of being supplied with actuating hydraulic fluid pressure so as to keep it engaged, and keeping the first/third layshaft clutch 15 in its state of not being supplied with actuating hydraulic fluid pressure and not being engaged. It should be noted that this shifting of the hub sleeve of the first speed synchronizer 71 can be performed smoothly at this time, because as explained above the first speed mainshaft idler gear 147, which is always meshed with the first speed layshaft idler gear 123 on the first/third layshaft 3, is substantially free to rotate at this time because the first/third layshaft clutch 15 is disengaged, or even if these parts are rotating somewhat due to dragging of the first/third layshaft clutch 15 this rotation is not substantially powered and can be easily overcome by the per se well known synchronizing action of the first speed synchronizer 71, so as to match the rotational speeds of the main shaft 11 and the first speed mainshaft idler gear 147. After this preparatory action of engaging the first speed synchronizer 71 and the main shaft 11 and the first speed mainshaft idler gear 147 has been accomplished satisfactorily, then the actual engagement of the first speed stage from the second speed stage, i.e. the actual change of speed stage, is smoothly and progressively accomplished by the above mentioned control system disengaging the second/fourth layshaft clutch 16 fairly sharply, and simultaneously at an appropriate timing engaging the first/third layshaft clutch 15 in a smooth and controlled manner (appropriate again, this time, to a downshifting action) by progressive supply of hydraulic fluid pressure to the pressure chamber of said first/third layshaft clutch 15. This changeover of the engagement and disengagement conditions of the first/third layshaft clutch 15 and the second/fourth layshaft clutch 16 is again made in an analogous manner to the change of speed stage in a conventional automatic transmission incorporating a conventional type of gear transmission mechanism which comprises a plurality of hydraulic fluid pressure actuated friction engaging mechanisms such as hydraulically actuated clutches and hydraulically actuated brakes. Finally, after the disengagement of the second/fourth layshaft clutch 16 and the engagement of the first/third layshaft clutch 15 have been quite completed, at a later stage as a concluding action the hub sleeve of the second speed synchronizer 72 is shifted by the control system from its leftward position to its rightward position, so as to rotationally disconnect the main shaft 11 and the second speed mainshaft idler gear 148. Thus the transition to the above described positions and engagement conditions of the various parts for providing the first speed stage is made.

Next, in the case of downshifting from the first speed stage to the neutral speed stage, first the gear transmission mechanism according to the third preferred embodiment of the present invention is in the condition described above with respect to the engagment of the first speed stage. From this condition, the above mentioned control system disengages the first/third layshaft clutch 15 by cessation of supply of hydraulic fluid pressure to the pressure chamber of said first/third layshaft clutch 15. The second/fourth layshaft clutch 16 is already disengaged, of course. Finally, after the disengagement of the first/third layshaft clutch 15 has been quite completed, at a later stage as a concluding action the hub sleeve of the first speed synchronizer 71 is shifted by the control system from its leftward position to its rightward position, so as to rotationally disconnect the main shaft 11 and the first speed mainshaft idler gear 147. Thus the transition to the above described positions and engagement conditions of the various parts for providing the neutral speed stage is made. It will be understood that, mutatis mutandis, this process will be suitable for the shifting from any forward speed stage to the neutral speed stage: in general, first the control system disengages whichever one of the first/third layshaft clutch 15 and the second/fourth layshaft clutch 16 is engaged, and subsequently the control system returns whichever of the first speed synchronizer 71, the second speed synchronizer 72, the third speed synchronizer 73, and the fourth speed synchronizer 74 is not in its rightward position to its rightward position.

Finally, in the case of shifting from the neutral speed stage to the reverse speed stage, first the gear transmission mechanism according to the third preferred embodiment of the present invention is in the condition described above with respect to the engagement of the neutral speed stage. From this condition, first as a preparatory action the reverse idler gear 163 is shifted by the control system from its rightward position on the reverse idler gear shaft 162 to its leftward position, so as to mesh both with the reverse driving gear 125 and with the reverses driven gear 164 formed on the outside of the hub sleeve of the first speed synchronizer 71, while said control system still keeps both the first/third layshaft clutch 15 and the second/fourth layshaft clutch 16 in their states of not being supplied with actuating hydraulic fluid pressure and not being engaged. It should be noted that this shifting of the reverse idler gear 163 on the reverse idler gear shaft 162 and its engagement with the reverse driving gear 125 and with the reverse driven gear 164 formed on the outside of the hub sleeve of the first speed synchronizer 71 can be performed smoothly at this time, because as explained above the reverse driving gear 125 with the first/third layshaft 3 and the reverse driven gear 164 formed on the outside of the hub sleeve of the first speed synchronizer 71 with the main shaft 11 are not substantially rotating at this time because the first/third layshaft clutch 15 and the second/fourth layshaft clutch 16 are both disengaged, or even if these members are rotating somewhat due to dragging of the first/third layshaft clutch 15 and/or the second/fourth layshaft clutch 16 this rotation is not substantially powered and can be easily overcome by the pushing action of the control system on the reverse idler gear 163. After this preparatory action of engaging the reverse idler gear 163 to the reverse driving gear 125 and the reverse driven gear 164 formed on the outside of the hub sleeve of the first speed synchronizer 71 has been accomplished satisfactorily, then the actual engagement of the reverse speed stage from the neutral speed stage, i.e. the actual change of speed stage, is smoothly and progressively accomplished by the above mentioned control system engaging the first/third layshaft clutch 15 in a smooth and controlled manner by progressive supply of hydraulic fluid pressure to the pressure chamber of said first/third layshaft clutch 15. However, the control system keeps the second/fourth layshaft clutch 16 disengaged by not supplying any actuating hydraulic fluid pressure to its pressure chamber. Thus the transition to the above described positions and engagement conditions of the various parts for providing the reverse speed stage is made.

It will be understood that, mutatis mutandis, the process explained above for shifting from forward speed stages to the neutral speed stage will also be suitable for the shifting from the reverse speed stage to the neutral speed stage: however also, of course, in addition the reverse idler gear 163 is also required to be shifted leftwards along the reverse idler gear shaft 162 so as to come out of meshing with the reverse driving gear 125 and the reverse driven gear 164 formed on the outside of the hub sleeve of the first speed synchronizer 71, after both the first/third layshaft clutch 15 and the second-/fourth layshaft clutch 16 has been disengaged by the control system.

Now, the various ratios provided by the gear transmission mechanism with multiple layshafts according to this third preferred embodiment of the present invention between the power input shaft 2 and the half shaft or axle 60 and/or the half shaft or axle 61 in the various speed stages available from said gear transmission mechanism, i.e. the final drive or reduction ratios provided thereby, will be given, in terms of the number of teeth on each of the gear wheels of said gear transmission mechanism. If the symbol "A" represents the number of teeth on the power input gear 12, the symbol "B" represents the number of teeth on the first/third layshaft driving gear 13 and also on the second/fourth layshaft driving gear 14 which is taken in this example as having the same number of teeth as the first/third layshaft driving gear 13 although this is not to be considered as limitative of the present invention in any way, the symbol "N" represents the number of teeth on the first speed layshaft fixed gear 123, the symbol "O" represents the number of teeth on the first speed mainshaft idler gear 147, the symbol "P" represents the number of teeth on the third speed mainshaft fixed gear 149, the symbol "Q" represents the number of teeth on the third speed layshaft idler gear 124, the symbol "R" represents the number of teeth on the power output gear 151, the symbol "S" represents the number of teeth on the differential power input ring gear 153, the symbol "T" represents the number of teeth on the second speed layshaft fixed gear 134, the symbol "U" represents the number of teeth on the second speed mainshaft idler gear 148, the symbol "V" represents the number of teeth on the fourth speed layshaft idler gear 135, the symbol "W" represents the number of teeth on the fourth speed mainshaft fixed gear 150, the symbol "X" represents the number of teeth on the reverse driving gear 125, and the symbol "Y" represents the number of teeth on the reverse driven gear 164 formed on the outside of the hub sleeve of the first speed synchronizer 71, then the final drive or reduction ratio provided by the gear transmission mechanism according to the present invention when it is set to its first stage is $(B/A)*(O/N)*(Q/P)*(S/R)$; the final drive or reduction ratio provided by the gear transmission mechanism according to the present invention when it is set to its second speed stage is $(B/A)*(U/T)*(Q/P)*(S/R)$; the final drive or reduction ratio provided by the gear transmission mechanism according to the present invention when it is set to its third speed stage is $(B/A)*(S/R)$; the final drive or reduction ratio provided by the gear transmission mechanism according to the present invention when it is set to its fourth speed stage is $(B/A)*(W/V)*(Q/P)*(S/R)$; and the final drive or reduction ratio provided by the gear transmission mechanism according to the present invention when it is set to its reverse speed stage is $(B/A)*(Y/X)*(Q/P)*(S/R)$.

In the shown third preferred embodiment of the gear transmission mechanism with multiple layshafts according to the present invention, as will be clear to one skilled in the art, by suitable choosing of the numbers of gear teeth on these various gear wheels, it is possible to provide various suitable combinations of final drive ratios of the gear transmission mechanism; and, in particular, it is possible to select the numbers of these teeth on these various gear wheels so as to make the final drive ratio in the third speed stage equal to unity, so that this is a directly connected speed stage, and so that thus the fourth speed stage is an overdrive speed stage. However, it is quite within the ability of one of ordinary skill in the art, based upon the disclosure herein, to alter the numbers of gear teeth on these gear wheels in order to provide other desired final drive or reduction ratios.

According to this construction, it will be seen that either one of the first/third layshaft 3 and the second-/fourth layshaft 4 can be selectively driven from the power input shaft 2, and that an appropriate one of the first speed mainshaft idler gear 147, the second speed mainshaft idler gear 148, the third speed layshaft idler gear 124, or the fourth speed layshaft idler gear 135 can be simultaneously rotationally coupled to its respective layshaft or to the main shaft 11, so as to drive the main shaft 11 at an appropriate rotational speed depending on the combination of the number of teeth on said idler gear and the number of teeth on the one of the first speed layshaft fixed gear 123, the second speed layshaft fixed gear 134, the third speed mainshaft fixed gear 149, and the fourth speed mainshaft fixed gear 150 which is in constant mesh therewith. By this rotation of the main shaft 11 and of the third speed layshaft fixed gear 124 which is rotationally coupled thereto, in this third preferred embodiment, the third speed layshaft fixed gear 124 and the power output gear 151 formed integrally therewith thereby rotate at an appropriate rotational speed, and thus said power output gear 151 drives the differential power input ring gear 153 of the differential gear mechanism to output rotational power at an appropriate final drive or reduction ratio. Further, it will be seen that (in a forward speed stage) while the corresponding one of the first/third layshaft 3 and the second/fourth layshaft 4 is being driven from the power input shaft 2 by the engagement of its appropriate clutch, either of the two idler gears relating to the speed stages corresponding to the other layshaft may be freely engaged to said layshaft or to the main shaft 11 (as appropriate and relevant), in preparation for engagement of the next forward speed stage desired to be engaged, whether said speed stage be one speed stage higher or one speed stage lower than the currently engaged speed stage; this is because the forward speed stages provided by the shown gear transmission mechanism, from the first speed stage to the fourth speed stage, utilize gear pairs which alternate between one of them being mounted on the first/third layshaft 3 and one of them being mounted on the second/fourth layshaft 4. Thus shifting from one speed stage to the next desired speed stage, either up or down, can be accomplished merely by exchanging the engagement and disengagement conditions of the first/third layshaft clutch 15 and the second/fourth layshaft clutch 16. Of course, this depends upon the fact that in the operation of an automatic transmission utilizing this gear transmission mechanism it is never necessary to shift directly between the first speed stage and the third speed stage, or between the second speed stage and the fourth speed stage. Finally, according to the shown construction, it will be realized that the axial length of this third embodiment of the gear transmission mechanism with multiple layshafts according to the present invention is remarkably short. Accordingly this gear transmission mechanism with multiple layshafts is again particularly suitable for utilization in a front engine front wheel drive vehicle (a so called FF vehicle) with a transversely mounted engine and gearbox configuration.

It will readily be apparent to one of ordinary skill in the transmission art, based upon the disclosure made herein, that the somewhat different arrangements with relation to the provision of reverse speed stage in this third embodiment do not provide any actual different operation, with regard to its basic nature, from the operation of the second preferred embodiment described above. The important differences between this third preferred embodiment and the first and second preferred embodiments described above are twofold.

First, the power output to the differential mechanism, in the case of this third preferred embodiment, is taken from a gear wheel (the power output gear 151) which is formed integrally with the layshaft gear for the third speed stage, not the layshaft gear for fourth speed stage as was the case in the first and second preferred embodiments shown earlier. This means that the power transmission path during engagement of the third speed stage is the simplest one, out of those for all the speed stages, in this third preferred embodiment of the gear transmission mechanism with multiple layshafts according to the present invention, whereas in the first and second preferred embodiment of the gear transmission mechanism with multiple layshafts according to the present invention it was the power transmission path during engagement of the fourth speed stage which was the simplest one, out of those for all the speed stages. Accordingly, whereas in the first and second preferred embodiments the fourth speed stage was the one which was most suitable for use as the normal speed driving speed stage (by providing the appropriate numbers of teeth on the gear wheels of the gear transmission mechanism), in this third preferred embodiment it is the third speed stage which is the one which is most suitable for use as the normal speed driving speed stage, and the fourth speed stage may conveniently be arranged to be an overdrive speed stage. Accordingly this third preferred embodiment is very suitable for such an application, and presents advantages with regard to quietness of operation of the normal speed driving speed stage (i.e. the third speed stage), with regard to durability of the transmission in this speed stage, and so on. This matter of the point of taking out of the rotational power for supply to the differential mechanism will be further discussed with reference to the fourth preferred embodiment of the present invention.

Second, in both the first and second preferred embodiments of the gear transmission mechanism with multiple layshafts according to the present invention described earlier, and in this third preferred embodiment, each of the speed stages has been provided by the use of a pair of gear wheels, one of them on one of the layshafts and the other on the main shaft, and one of them being fixed to its respective shaft while the other is free to rotate on its respective shaft and is selectively rotationally coupled thereto by a synchronizer relating to that speed stage. However, whereas in the first and second embodiments of the present invention described previously in each of the first speed stage, the second speed stage, the third speed stage, and the fourth speed stage it was the main shaft gear wheel which was the fixed one, and it was the layshaft gear wheel which was the free one which selectively could be fixed to its layshaft by its synchronizer, by contrast in the third preferred embodiment of the present invention in the case of the third speed stage and the fourth speed stage only is it the case that it is the main shaft gear wheel which was the fixed one, and it was the layshaft gear wheel which was the free one which selectively could be fixed to its layshaft by its synchronizer, and on the other hand in the case of the first speed stage and the second speed stage it is the case that it is the layshaft gear wheel which is the fixed one, and it is the main shaft gear wheel which is the free one which selectively can be fixed to the main shaft by its synchronizer. This difference is important for the construction of the gear transmission mechanism, and, depending upon circumstances and the particular design, can be helpful for minimizing the axial length thereof.

Figure 7:
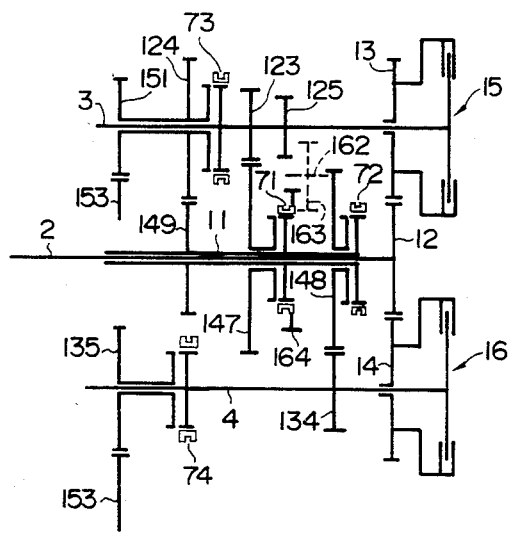
FIG. 7 is a schematic skeleton diagram, similar to FIGS. 3, 5, and 6, showing the layout of the shafts and gear wheels and other devices of a gear transmission mechanism which is a fourth preferred embodiment of the gear transmission mechanism with multiple layshafts according to the present invention, and showing their interrelationships.
Figure 8:
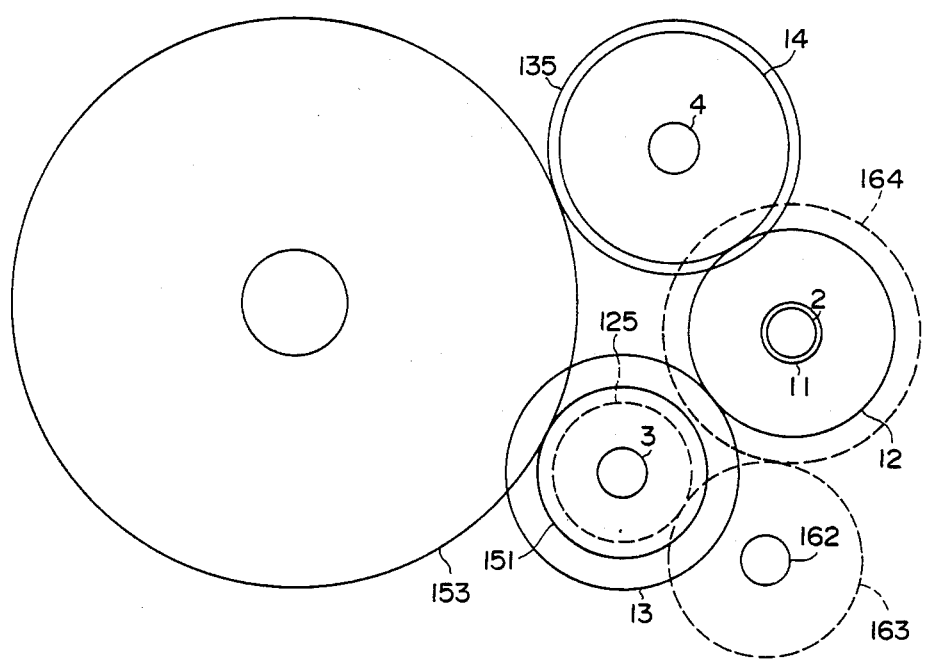
FIG. 8 is a schematic end on view, similar to FIG. 2, showing the actual spatial distribution of the shafts and the gear wheels in the gear transmission mechanism which is the fourth preferred embodiment of the gear transmission mechanism with multiple layshafts according to the present invention shown in FIG. 7.

In FIGS. 7 and 8, there is shown a fourth preferred embodiment of the gear transmission mechanism with multiple layshafts according to the present invention, in a fashion similar to FIGS. 3, 5 and 6, and to FIG. 2, respectively. In FIGS. 7 and 8, parts of this fourth preferred embodiment shown, which correspond to parts of the first, second, and third preferred embodiments shown in FIGS. 1 through 6, and which have the same functions, are designated by the same reference numerals as in those figures. No detailed structural diagram like FIG. 1 for the first preferred embodiment or FIG. 4 for the second preferred embodiment is given for this fourth preferred embodiment, either, because, based upon the disclosure herein and by analogy with the views shown in FIGS. 1 and 4 which relate to said previously explained embodiments, one of ordinary skill in the art will be well able to conceive of such details for himself.

In this fourth preferred embodiment, the only significant difference from the third preferred embodiment of the present invention shown in FIG. 6 is the arrangements for provision of the fourth speed stage, and the arrangements for taking out rotational power from the gear transmission mechanism and providing said rotational power to the differential mechanism. In fact, the order as seen in the figure of the arrangement of the first speed mainshaft idler gear 147 and the second speed mainshaft idler gear 148 on the main shaft 11 is reversed as compared to the order in the third preferred embodiment shown in FIG. 6, and corresponding to this the dimensions as shown in FIG. 7 of some of the gear wheels and other structures of the gear transmission mechanism are slightly changed from the corresponding dimensions in the third embodiment as shown in FIG. 6; and also for positioning in the figure of the arrangements for the reverse speed stage is altered; but these differences are not significant, as they do not affect the principles of functioning of the gear transmission mechanism.

However, with regard to the arrangements for the provision of the fourth speed stage, they are as follows. The fourth speed layshaft idler gear 135 in this fourth preferred embodiment is mounted, as before, on the second/fourth layshaft 4, and is as before selectively engagable to said second/fourth layshaft 4 by the fourth speed synchronizer 74. However, in this fourth preferred embodiment, this fourth speed layshaft idler gear 135 is not in constant mesh with any fourth speed mainshaft fixed gear such as the fourth speed mainshaft fixed gear 150 of the third preferred embodiment described above; indeed, the fourth speed layshaft idler gear 135 is not meshed with any mainshaft gear at all, and no analog exists for said fourth speed mainshaft fixed gear 150 of the third embodiment in this fourth preferred embodiment, the main shaft 11 in this fourth preferred embodiment only having the three gears on it: the first speed mainshaft idler gear 147, the second speed mainshaft idler gear 148, and the third speed mainshaft fixed gear 149 (all of them as in the third preferred embodiment). However, the fourth speed layshaft idler gear 135 is, in this fourth preferred embodiment, in constant meshing engagement with the differential power input ring gear 153 of the differential device, said differential power input ring gear 153 also being in constant mesh, as in the third preferred embodiment, with the third speed layshaft idler gear 124 which is as before mounted rotatably on the first/third layshaft 3 and is selectively engagable thereto by the third speed synchronizer 73.

This arrangement, with the differential power input ring gear 153 of the differential device being in constant meshing engagement with two idler gears at once, the third speed layshaft idler gear 124 and the fourth speed layshaft idler gear 135, is quite unique to this fourth preferred embodiment. It is functional because, as will be understood from the previously made descriptions of the functioning of the speed stages other than the fourth speed stage of the third preferred embodiment (which are the same for this fourth preferred embodiment), and as will be understood from the descriptions to be made shortly of the functioning of the fourth speed stage of this fourth preferred embodiment, it never occurs that the third speed layshaft idler gear 124 and the fourth speed layshaft idler gear 135 are both substantially powered at the same time; in other words, one of these two idler gears is always idling. This is because it never occurs that the fourth speed synchronizer 74 is engaged, unless it is the case that both the first/third clutch 15 is disengaged and also the main shaft 11 is not being substantially powered, so that the third speed layshaft idler gear 124 is not being substantially powered either from the first/third layshaft 3 or from the main shaft 11.

In FIG. 8, the actual spatial layout of the power input shaft 2, the first/third layshaft 3, the second/fourth layshaft 4, the reverse idler gear shaft 162, and the differential power input ring gear 153, and of some of the gear wheels mounted thereon, can be seen from a point of view to the left of FIG. 7 looking rightwards in that figure.

Now, for this fourth preferred embodiment, first the positions and engagement conditions of each of the first speed synchronizer 71, the second speed synchronizer 72, the third speed synchronizer 73, the fourth speed synchronizer 74, the first/third layshaft clutch 15, and the second/fourth layshaft clutch 16 will be explained, during the engagement of the fourth speed stage; and then the sequences of shifting and of engagement and disengagement operations of these means which are employed in the operation of upshifting from the third speed stage to said fourth speed stage, and in the operation of downshifting from said fourth speed stage to said third speed stage, will be explained. Other explanations with regard to the operation and shifting of these means, for providing the neutral speed stage, the first speed stage, the second speed stage, the third speed stage, and the reverse speed stage, and for shifting between these speed stages, in this fourth preferred embodiment, will not be required, because such operations and shiftings are exactly the same as in the third preferred embodiment, already explained at length.

In the fourth speed stage, the hub sleeve of the first speed synchronizer 71 is set to its rightwardly displaced position by the above mentioned transmission control system, the hub sleeve of the second speed synchronizer 72 is also set to its rightwardly displaced position by said control system, the hub sleeve of the third speed synchronizer 73 is also set to its rightwardly displaced position by the above mentioned transmission control system, the hub sleeve of the fourth speed synchronizer 74 is set to its leftwardly displaced position by said control system, and the first/third layshaft clutch 15 is not supplied with actuating hydraulic fluid pressure by said control system, while the second/fourth layshaft clutch 16 is supplied with actuating hydraulic fluid pressure by said control system; so that said first/third layshaft clutch 15 is not engaged, but said second/fourth layshaft clutch 16 is engaged according to supply of hydraulic fluid pressure to its pressure chamber. In this operational condition, the rotation of the power input shaft 2 which as explained above is always rotationally driven by the crankshaft of the internal combustion engine (not shown) via the fluid torque converter is not positively transmitted to the first/third layshaft 3, since the first/third layshaft clutch 15 is disengaged; and, even if some of this rotation is transmitted to the first/third layshaft 3, since the first speed synchronizer 71 and the third speed synchronizer 73 are disengaged, therefore no substantial rotational force is transmitted thence to the main shaft 11 or to the power output gear 151. However, the rotation of the power input shaft 2 is transmitted through the power input gear 12, through the second/fourth layshaft driving gear 14, through the second/fourth layshaft clutch 16 which as explained above is engaged, to the second/fourth layshaft 4, and thence is transmitted via the fourth speed synchronizer 74 to the fourth speed layshaft idler gear 135 now engaged therewith. This fourth speed layshaft idler gear 135 transmits this rotational power directly to the differential power input ring gear 153 of the differential gear mechanism, said differential power input ring gear 135 being, as stated above, in constant mesh with said fourth speed layshaft idler gear 135. Thus the gear transmission mechanism according to the third preferred embodiment of the present invention functions in its fourth speed stage. The third speed layshaft idler gear 124 and the power output gear 151 formed integrally therewith are substantially free at this time, because the third speed synchronizer 73 is disengaged and the first/third clutch 15 is disengaged, and also the main shaft 11 is not substantially being powered since the first speed synchronizer 71 and the second speed synchronizer 72 are disengaged, and so no problem arises of the differential power input ring gear 153 being attempted to be driven at two different mutually incompatible speeds.

Now, in the case of upshifting from the third speed stage to the fourth speed stage, first the gear transmission mechanism according to the third preferred embodiment of the present invention is in the condition described above (relating to the third preferred embodiment and also to this fourth preferred embodiment) with respect to the engagement of the third speed stage. From this condition, first as a preparatory action the hub sleeve of the fourth speed synchronizer 74 is shifted by the control system from its rightward position to its leftward position, so as to rotationally connect the second/fourth layshaft 4 and the fourth speed layshaft idler gear 135, while still keeping the first/third layshaft clutch 15 in its state of being supplied with actuating hydraulic fluid pressure so as to keep it engaged, and keeping the second/fourth layshaft clutch 16 in its state of not being supplied with actuating hydraulic fluid pressure and not being engaged. It should be noted that this shifting of the hub sleeve of the fourth speed synchronizer 74 can be performed smoothly at this time, because as explained above the second/fourth layshaft 4 is substantially free to rotate at this time because the second/fourth layshaft clutch 16 is disengaged and also the second speed synchronizer 72 is disengaged, or even if the second/fourth layshaft 4 is rotating somewhat due to dragging of the second/fourth layshaft clutch 16 and/or the second speed synchronizer 72 this rotation is not substantially powered and can be easily overcome by the per se well known synchronizing action of the fourth speed synchronizer 74, so as to match the rotational speeds of the second/fourth layshaft 4 and the fourth speed layshaft idler gear 135. After this preparatory action of engaging the fourth speed synchronizer 74 and the second/fourth layshaft 4 to the fourth speed layshaft idler gear 135 has been accomplished satisfactorily, then the actual engagement of the fourth speed stage from the third speed stage, i.e. the actual change of speed stage, is smoothly and progressively accomplished by the above mentioned control system disengaging the first/third layshaft clutch 15 fairly sharply, and simultaneously at a timing appropriate for an upshifting action engaging the second/fourth layshaft clutch 16 in a smooth and controlled manner by progressive supply of hydraulic fluid pressure to the pressure chamber of said second/fourth layshaft clutch 16. This changeover of the engagement and disengagement conditions of the first/third layshaft clutch 15 and the second/fourth layshaft clutch 16 is, as previously, made in an analogous manner to the change of speed stage in a conventional automatic transmission incorporating a conventional type of gear transmission mechanism which comprises a plurality of hydraulic fluid pressure actuated friction engaging mechanisms such as hydraulically actuated clutches and hydraulically actuated brakes. The third speed layshaft idler gear 124 and the power output gear 151 formed integrally therewith are substantially free at this time, because the first/third clutch 15 is disengaged, and also the main shaft 11 is not substantially being powered since the first speed synchronizer 71 and the second speed synchronizer 72 are disengaged, and so no problem arises of the differential power input ring gear 153 being attempted to be driven at two different mutually incompatible speeds. Finally, after the disengagement of the first/third layshaft clutch 15 and the engagement of the second/fourth layshaft clutch 16 have been quite completed, at a later stage as a concluding action the hub sleeve of the third speed synchronizer 73 is shifted by the control system from its leftward position to its rightward position, so as to rotationally disconnect the first/third layshaft 3 and the third speed layshaft idler gear 124. Thus the transition to the above described positions and engagement conditions of the various parts for providing the fourth speed stage is made.

On the other hand, in the case of downshifting from the fourth speed stage to the third speed stage, first the gear transmission mechanism according to the third preferred embodiment of the present invention is in the condition described above with respect to the engagement of the fourth speed stage. From this condition, first as a preparatory action the hub sleeve of the third speed synchronizer 73 is shifted by the control system from its rightward position to its leftward position, so as to rotationally connect the first/third layshaft 3 and the third speed layshaft idler gear 124, while still keeping the second/fourth layshaft clutch 16 in its state of being supplied with actuating hydraulic fluid pressure so as to keep it engaged, and keeping the first/third layshaft clutch 15 in its state of not being supplied with actuating hydraulic fluid pressure and not being engaged. It should be noted that this shifting of the hub sleeve of the third speed synchronizer 73 can be performed smoothly at this time, because as explained above the first/third layshaft 3 is substantially free to rotate at this time because the first/third layshaft clutch 15 is disengaged, and also because the main shaft 11 is not substantially rotating due to the disengagement of the first speed synchronizer 71 and of the second speed synchronizer 72; or even if the first/third layshaft 3 is rotating somewhat due to dragging of the first/third layshaft clutch 15 this rotation is not substantially powered and can be easily overcome by the per se well known synchronizing action of the third speed synchronizer 73, so as to match the rotational speeds of the first/third layshaft 3 and the third speed layshaft idler gear 124. After this preparatory action of engaging the third speed synchronizer 73 and the first/third layshaft 3 to the third speed layshaft idler gear 124 has been accomplished satisfactorily, then the actual engagement of the third speed stage from the fourth speed stage, i.e. the actual change of speed stage, is smoothly and progressively accomplished by the above mentioned control system disengaging the second/fourth layshaft clutch 16 fairly sharply, and simultaneously at an appropriate timing engaging the first/third layshaft clutch 15 in a smooth and controlled manner (appropriate, this time, to a downshifting action) by progressive supply of hydraulic fluid pressure to the pressure chamber of said first/third layshaft clutch 15. This changeover of the engagement and disengagement conditions of the first/third layshaft clutch 15 and the second/fourth layshaft clutch 16 is again made in an analogous manner to the change of speed stage in a conventional automatic transmission incorporating a conventional type of gear transmission mechanism which comprises a plurality of hydraulic fluid pressure actuated friction engaging mechanisms such as hydraulically actuated clutches and hydraulically actuated brakes. Finally, after the disengagement of the second/fourth layshaft clutch 16 and the engagement of the first/third layshaft clutch 15 have been quite completed, at a later stage as a concluding action the hub sleeve of the fourth speed synchronizer 74 is shifted by the control system from its leftward position to its rightward position, so as to rotationally disconnect the second/fourth layshaft 4 and the fourth speed layshaft idler gear 135. Thus the transition to the above described positions and engagement conditions of the various parts for providing the third speed stage is made.

This fourth preferred embodiment of the gear transmission mechanism with multiple layshafts according to the present invention exhibits the same advantages as does the third preferred embodiment shown in FIG. 6, with regard to the power transmission path during engagement of the third speed stage being simple, and accordingly is very suitable for use in application in which it is the third speed stage which is the one which is most suitable for use as the normal speed driving speed stage, and in which the fourth speed stage is desired to be arranged to be an overdrive speed stage. However, this fourth preferred embodiment also exhibits the advantage that also the power transmission path during engagement of the fourth speed stage is simple. If, as suggested above, this fourth speed stage is an overdrive speed stage, then it is likely that such an overdrive speed stage of an automotive vehicle will be used for quite a considerable proportion of the total time of utilization of the vehicle, as when driving at high speed on an expressway. Accordingly this fourth preferred embodiment is very suitable for such an application, and presents advantages with regard to quietness of operation of the overdrive speed stage, durability of the transmission in the overdrive speed stage, and so on, as well as with regard to these good characteristics in the third speed stage which is the normal running speed stage.

The matter of the point where rotational power is taken from the gear transmission mechanism with multiple layshafts according to the present invention, in the various embodiments shown, may be summarized as follows. In the first, second, and third preferred embodiments, the rotational power was effectively taken out from the main shaft 11, since it was taken out from a certain idler gear wheel which was in permanent mesh with a gear wheel which was fixed to said main shaft 11. However, in the fourth preferred embodiment, the rotational power was taken out either from the mainshaft, effectively, according to the above concept, or from the one of the layshafts, i.e. the second/fourth layshaft, which was not associated with said certain idler gear wheel. This taking out of the rotational power from either of two alternative points in the gear transmission mechanism has, as stated above, advantages with relation to application to automotive use that have been sufficiently expatiated upon.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. For instance, it is not intended to restrict the present invention to the use of only two layshafts, although obviously for applications in which the number of speed stages is not very high that is the preferred configuration. Nor is it necessary for the power input shaft 2 to pass through the hollow center of the main shaft 11, although this is an advantageous construction. Also, it would be possible for the rotational power output of the gear transmission mechanism to be taken directly from the main shaft 11, instead of from one of the gear wheels for providing one of the speed stages which rotated along with said main shaft 11. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

What is claimed is:

1. A gear transmission for an automotive vehicle, comprising:
   a first shaft which serves as a power input shaft;
   a second shaft arranged so as to be spaced sidewards from and in parallel with said first shaft;
   a third shaft arranged so as to be spaced sidewards from and in parallel with said first and second shafts;
   a fourth shaft in tubular form arranged over said first shaft to be coaxial therewith;
   a first subtransmission system which comprises a plurality of first gears and a first clutch and which selectively transmits rotational power between said first and second shafts;
   a second subtransmission system which comprises a plurality of second gears and a second clutch and which selectively transmits rotational power between said first and third shafts;
   a third subtransmission system which comprises a plurality of third gears and a first synchronizer and which selectively transmits rotational power between said second and fourth shafts;
   a fourth subtransmission system which comprises a plurality of fourth gears and a second synchronizer and which selectively transmits rotational power between said third and fourth shafts;
   a power output member which rotates about an axis arranged as spaced sidewards from and in parallel with said first and fourth shafts; and
   a gear train which transmits rotational power between said fourth shaft and said power output member.

2. A gear transmission according to claim 1, further comprising a fifth subtransmission system which comprises a plurality of fifth gears and a third synchronizer and which selectively transmits rotational power between said second and fourth shafts when said first synchronizer is disengaged.

3. A gear transmission according to claim 2, further comprising a sixth subtransmission system which comprises a fourth synchronizer and which selectively directly rotationally connects said third shaft with said power output member.

4. A gear transmission according to claim 3, wherein said power output member is arranged coaxial with said third shaft.

5. A gear transmission according to claim 2, wherein said first and third synchronizers further comprise a common hub sleeve which is shifted to a first side of a neutral position thereof to engage said first synchronizer and to a second side of said neutral position thereof opposite said first side to engage said third synchronizer.

6. A gear transmission according to claim 3, wherein said second and fourth synchronizers further comprise a common hub sleeve which is shifted to a first side of a neutral position thereof to engage said second synchronizer and to a second side of said neutral position thereof opposite said first side to engage said fourth synchronizer.

* * * * *